(12) United States Patent
Kawamura et al.

(10) Patent No.: US 7,675,939 B2
(45) Date of Patent: Mar. 9, 2010

(54) TRANSMISSION APPARATUS AND METHOD, RECEPTION APPARATUS AND METHOD, COMMUNICATION SYSTEM, RECORDING MEDIUM, AND PROGRAM

(75) Inventors: Seigo Kawamura, Tokyo (JP); Shinobu Kusunoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 11/039,994

(22) Filed: Jan. 24, 2005

(65) Prior Publication Data

US 2005/0207443 A1 Sep. 22, 2005

(30) Foreign Application Priority Data

Jan. 30, 2004 (JP) ............................. 2004-023126
Sep. 27, 2004 (JP) ............................. 2004-279555

(51) Int. Cl.
*H04J 3/16* (2006.01)

(52) U.S. Cl. .................................................. 370/469

(58) Field of Classification Search ................ 709/223, 709/239–244; 370/254, 218, 225, 228, 230, 370/230.1, 231, 232, 236, 236.1, 236.2, 237, 370/230.2, 469
See application file for complete search history.

(56) References Cited

U.S. PATENT DOCUMENTS

| | | | | |
|---|---|---|---|---|
| 6,324,169 | B1 * | 11/2001 | Roy | 370/260 |
| 6,674,477 | B1 * | 1/2004 | Yamaguchi et al. | 348/387.1 |
| 7,158,491 | B1 * | 1/2007 | Le | 370/328 |
| 2003/0039237 | A1 * | 2/2003 | Forslow | 370/352 |
| 2003/0149792 | A1 * | 8/2003 | Goldstein | 709/246 |

* cited by examiner

*Primary Examiner*—Kwang B Yao
*Assistant Examiner*—Juvena Loo
(74) *Attorney, Agent, or Firm*—Oblon, Spivak, McClelland, Maier & Neustadt, L.L.P.

(57) ABSTRACT

The present invention is intended to realize high-speed and stable communication. A multi-flow RTP divides the data of one RTP session into pieces that can be transmitted through UDP ports through respectively and supplies the divided pieces of data to these ports. An RTCP controls the UDP ports through to transmit the divided data and controls a TCP port to transmit control information for reconstructing the divided data. UDP ports through receive the divided data and supplies the received data to a multi-flow RTP. An RTCP obtains the control information from the TCP port and supplies it to the multi-flow RTP. The multi-flow RTP reconstructs the divided data according to the control information and supplies the reconstructed data to the player, which reproduces the reconstructed data. The present invention is applicable to a stream data distribution system, for example.

25 Claims, 21 Drawing Sheets

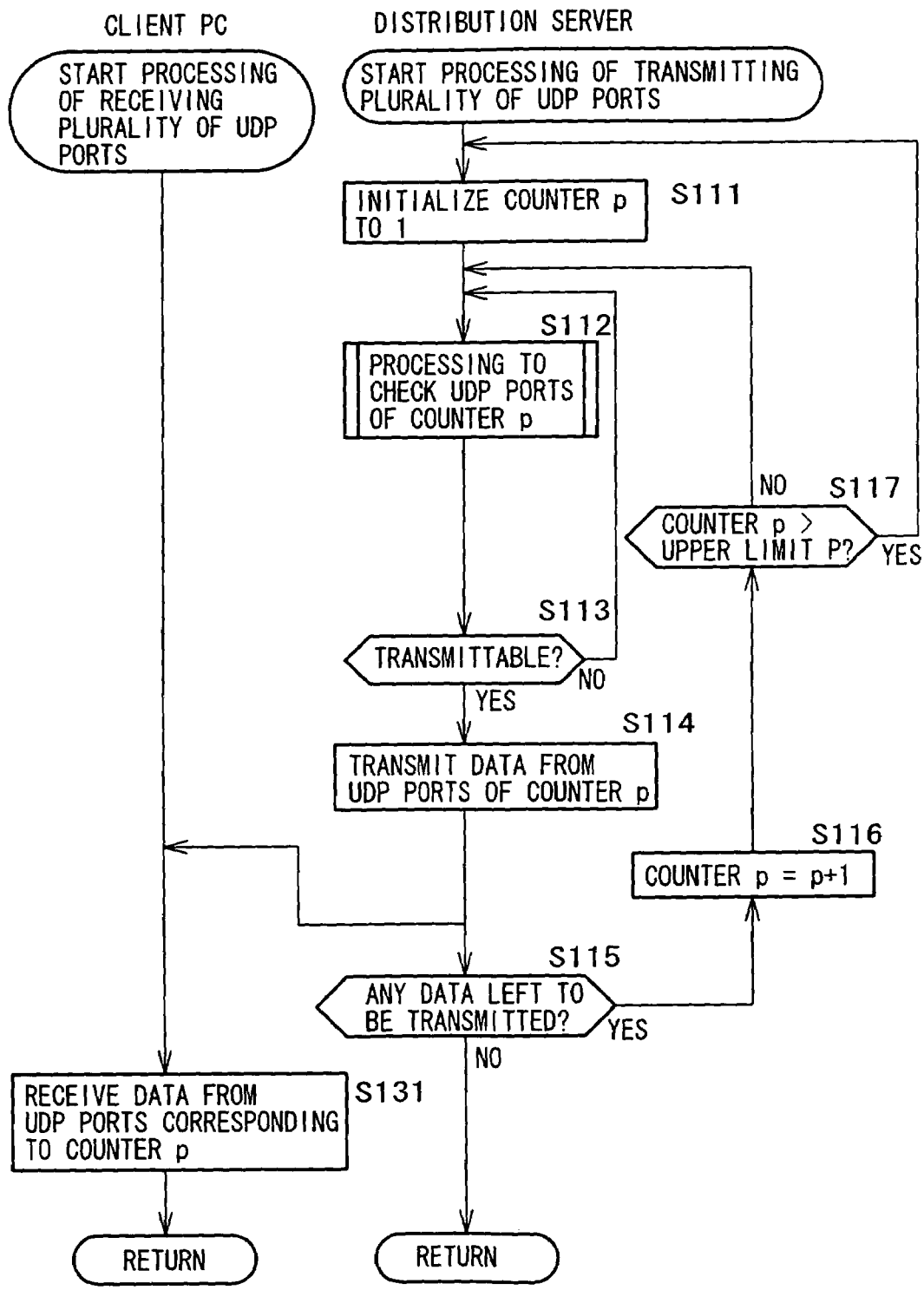
F I G. 18

TRANSMISSION APPARATUS AND METHOD, RECEPTION APPARATUS AND METHOD, COMMUNICATION SYSTEM, RECORDING MEDIUM, AND PROGRAM

BACKGROUND OF THE INVENTION

The present invention relates to a transmission apparatus and method, a reception apparatus and method, a communication system, a recording medium, and a program. Particularly, the present invention relates to a transmission apparatus and method, a reception apparatus and method, a communication system, a recording medium, and a program that are designed to restrain the delay of data in data communication so as to realize stable data communication.

Technologies for the data distribution with the reproduction time of mass stream data, for example guaranteed have been gaining in popularity.

Routers on the Internet sometimes perform flow control in which the flow of data to be forwarded (or transferred) is monitored to lower the forward priority of a flow in which a mass of data is transmitted. With general-purpose routers, each flow of data is identified by the IP addresses of the source and destination of transmission, the transport protocol used, and the port numbers of source and destination of transmission.

One of the above-mentioned communication procedures is RTP (Real Time Protocol) procedure, for example. In the case of RTP procedure, streaming control is executed by RTSP (Real Time Streaming Protocol) when stream data is communicated between a distribution server and a client PC (Personal Computer). For data transmission control, RTCP (RTP Control Protocol) is used and moving images are forwarded by RTP. In the case of moving image forwarding technologies based on the related-art RTP, one port is used for one RTP session to realize the forwarding of moving images.

In addition, a technology was proposed in which a bit stream is divided for transmitting and receiving through different ports (refer to Patent Document 1, for example).

Further, a technology was proposed in which optimum packet communication processing in accordance with terminal performance is realized (refer to Patent Document 2, for example).

Patent Document 1: Japanese Patent Laid-open No. 2002-017637

Patent Document 2: Japanese Patent Laid-open NO. 2003-152544

In forwarding moving images in the related-art RTP procedure, each router on the Internet is monitoring the flow of data to be forwarded and executes flow control for lowering the forward priority of each flow that is transmitting a mass of data, thereby preventing the communication from excessively occupying the band.

In addition, when the buffer becomes full due to an overload state for example, each router discards received packets.

In order to cope with such a situation, if a congestion occurs due to the discard of packets on the router for example, TCP (Transmission Control Protocol) once drops the speed and then gradually raises the window size (or a communicable data amount) equivalent to multiples of packet length, thereby searching for an optimum communication rate (this is known as slow start).

The following describes congestion. In TCP for example, if data drops on a communication route, a repeat request is sent from the transmission destination to the transmission source. If data drops continuously, repeat requests also occur continuously. This will make congestion worse on communication routes, which in turn makes the drop of data worse, thereby hampering stable data forwarding. The situation in which stable data forwarding is hindered is called congestion. For example, as shown in FIG. 1, congestion takes place more or less after the start of communication. In FIG. 1, the horizontal axis represents time while the vertical axis represents the volume (in bytes) of data that is received at the transmission destination in a unit time.

To be more specific, as shown in FIG. 1, in the initial stage after the start of communication, flow control by data forward volume is not executed, so that the communication rate is maintained to a certain degree. When a certain period of time passes after the start of communication, repeat requests frequently receive from the transmission destination, so that the communication route is further crowed by repeated data and repeat requests, eventually causing a congestion as indicated by A in FIG. 1.

Therefore, if double or triple congestion occurs, it takes long time until finding an optimum communication rate, thereby making the communication slow in transmission rate. Further, if the buffering of stream data runs short due to such a situation for example, the reproduction of stream data may be discontinued, thereby hindering the smooth reproduction of stream data.

In order to avoid the above-mentioned situation, UDP (User Datagram Protocol) may be used as substitute for TCP, for example. Use of UDP provides high-speed communication because no flow control and congestion control are executed like TCP, but at the cost of a problem that the arrival of data is not guaranteed because the reliable transmission of data cannot be ensured.

SUMMARY OF THE INVENTION

It is an object of the present invention to realize the high-speed and stable communication of stream data especially by transmitting the communication data of one session in the session layer by use of a plurality of ports of the transport layer.

In carrying out the invention and according to a first aspect thereof, there is provided a transmission apparatus including: a plurality of first transmission units for transmitting data by a first protocol of a transport layer; a generation unit for generating control information for reproducing the data, the control information including port numbers and a used port count of the plurality of first transmission units; a second transmission unit for transmitting, by a second protocol of the transport layer, the control information generated by the generation unit; and a control unit for controlling data for transmission by a protocol of a session layer such that the data is allocated to the plurality of first transmission units in accordance with each of operation states and the allocated data is transmitted.

In the transmission apparatus, the control unit can control the data for transmission by the protocol of the session layer such that the data is allocated to the plurality of first transmission unit in accordance with the operation state thereof in a round-robin manner and the allocated data is transmitted.

In the transmission apparatus, the control unit can transmit the data for transmission by the protocol of the session layer such that the data is allocated to transmittable one of the plurality of first transmission unit and the allocated data is transmitted.

The above-mentioned transmission apparatus further includes a division unit for dividing the data to be transmitted by the protocol of the session layer into a plurality of pieces of data. Therefore, the control unit can control the plurality of pieces of data obtained by the division unit such that the data is allocated to the plurality of first transmission unit in accordance with each of operation states and the allocated data is transmitted by the first protocol of the transport layer.

In the above-mentioned transmission apparatus, the generation unit can generate control information for combining divided data when the data is divided by the division unit, the control information including the port numbers and the used port count of the plurality of first transmission units.

In the above-mentioned transmission apparatus, the control unit can control such that the same data to be transmitted by the protocol in the session layer is transmitted by the first protocol in the transport layer by each of the plurality of first transmission units.

In the above-mentioned transmission apparatus, the generation unit can generate control information for identifying data to be transmitted by the protocol in the session layer to reproduce the data, the control information including the port numbers and the used port count of the plurality of first transmission units.

In the above-mentioned transmission apparatus, the second protocol may be TCP.

In the above-mentioned transmission apparatus, the protocol in the session layer may be RTP.

In the above-mentioned transmission apparatus, the first protocol in the transport layer may be a protocol that does not confirm the arrival of transmitted data.

In the above-mentioned transmission apparatus, the first protocol in the transport layer that does not confirm the arrival of transmitted data may be UDP.

In the above-mentioned transmission apparatus, the first protocol in the transport layer may be TCP.

In carrying out the invention and according to a second aspect thereof, there is provided a transmission method including: a plurality of first transmission steps for transmitting data by a first protocol of a transport layer; a generation step for generating control information for reproducing the data, the control information including port numbers and a used port count of the plurality of first transmission steps; a second transmission step for transmitting the control information generated by the generation step by a second protocol of the transport layer; and a control step for controlling data to be transmitted by a protocol of a session layer so as to be transmitted in accordance with each of operation states of the plurality of first transmission steps.

In carrying out the invention according to a third aspect thereof, there is provided a program of first recording medium including: a plurality of first transmission control steps for controlling transmission of data by a first protocol of a transport layer; a generation control step for controlling generation of control information for reproducing the data, the control information including port numbers and a used port count of the plurality of first transmission steps; a second transmission control step for controlling transmission, by a second protocol of the transport layer, the control information generated by the generation control step; and an operation control step for controlling data to be transmitted by a protocol of a session layer so as to be transmitted in accordance with each of operation states of the plurality of first transmission control steps.

In carrying out the invention and according to a fourth aspect thereof, there is provided a first program including: a plurality of first transmission control steps for controlling transmission of data by a first protocol of a transport layer; a generation control step for controlling generation of control information for reproducing the data, the control information including port numbers and a used port count of the plurality of first transmission steps; a second transmission control step for controlling transmission, by a second protocol of the transport layer, the control information generated by the generation control step; and an operation control step for controlling data to be transmitted by a protocol of a session layer so as to be transmitted in accordance with each of operation states of the plurality of first transmission control steps.

In carrying out the present invention according to a fifth aspect thereof, there is provided a reception apparatus including: a plurality of first reception units for receiving data by a first protocol of a transport layer; a second reception unit for receiving control information for reproducing the data by a second protocol of the transport layer, the control information including port numbers and a used port count of the plurality of first reception units; and a reproduction unit for reproducing, as data received by a protocol of a session layer, the data on the basis of the control information.

In the above-mentioned reception apparatus, the data may be a plurality of divided data; the plurality of first reception units may receive the plurality of divided data; and the reproduction unit may combine, for reproduction, the plurality of divided data as received data of the protocol in the session layer on the basis of the control information including information for combining the divided data and reproducing the combined data in addition to the port numbers and the used port count received by the second reception unit.

In the above-mentioned reception apparatus, the data may be a plurality of the same data; the plurality of first reception units may receive each of the plurality of the same data; and the reproduction unit may reproduce data received first as received data of the protocol in the session layer among the plurality of first reception units on the basis of the control information including information for identifying the data in addition to the port numbers and the used port count received by the second reception unit.

In the above-mentioned reception apparatus, the second protocol may be TCP.

In the above-mentioned reception apparatus, the protocol in the session layer may be RTP.

In the above-mentioned reception apparatus, the first protocol in the transport layer may be a protocol that does not confirm the arrival of transmitted data.

In the above-mentioned reception apparatus, the first protocol in the transport layer may be UDP.

In the above-mentioned reception apparatus, the first protocol in the transport layer may be TCP.

In carrying out the invention and according to a sixth aspect thereof, there is provided a reception method including: a plurality of first reception steps for receiving data by a first protocol of a transport layer; a second reception step for receiving control information for reproducing the data by a second protocol of the transport layer, the control information including port numbers and a used port count of the plurality of first reception steps; and a reproduction step for reproducing the data on the basis of the control information as data received by a protocol of a session layer.

In carrying out the present invention and according to a seventh aspect thereof, there is provided a program of second recording medium including: a plurality of first reception control steps for controlling reception of data by a first protocol of a transport layer; a second reception control step for controlling reception of control information for reproducing the data by a second protocol of the transport layer, the control information including port numbers and a used port count of the plurality of first reception control steps; and a reproduction control step for controlling reproduction of the data on the basis of the control information as data received by a protocol of a session layer.

In carrying out the present invention and according to an eighth aspect thereof, there is provided a second program including: a plurality of first reception control steps for controlling reception of data by a first protocol of a transport layer; a second reception control step for controlling reception of control information for reproducing the data by a second protocol of the transport layer, the control information including port numbers and a used port count of the plurality of first reception control steps; and a reproduction control step for controlling reproduction of the data on the basis of the control information as data received by a protocol of a session layer.

In carrying out the invention and according to a ninth aspect thereof, there is provided a communication system based on a transmission apparatus and a reception apparatus, the transmission apparatus including: a plurality of transmission units for transmitting data by a protocol of a transport layer; a generation unit for generating control information for reproducing the data, the control information including port numbers and a used port count of the plurality of first transmission units; a second transmission unit for transmitting, by a second protocol of the transport layer, the control information generated by the generation unit; and a control unit for controlling data for transmission by a protocol of a session layer such that the data is allocated to the plurality of first transmission units in accordance with each of operation states and the allocated data is transmitted; the reception apparatus including: a reception unit for receiving data by a protocol of a transport layer; a second reception unit for receiving control information for reproducing the data by a second protocol of the transport layer, the control information including port numbers and a used port count of the first reception units; and a reproduction unit for reproducing the data on the basis of the control information as data received by a protocol of a session layer.

In the transmission apparatus and method and the program according to the invention, data may be transmitted through a plurality of communication routes by the first protocol of the transport layer, the control information including port numbers and used port count for reproducing the data may be generated, the generated control information may be transmitted by the second protocol of the transport layer, and the data to be transmitted by the protocol of the session layer may be controlled so as to allocate the data in accordance with each of operate states through a plurality of communication routes.

In the reception apparatus and method and the program according to the invention, data may be received by the first protocol of the transport layer through a plurality of communication routes, the control information including port numbers and used port count for reproducing the data may be received by the second protocol of the transport layer, and the data may be reproduced on the basis of the control information as the data received by the protocol of the session layer.

In the communication system according to the invention, data may be transmitted from the transmission apparatus by the protocol of the transport layer through a plurality of communication routes, the control information including port numbers and used port count for reproducing the data may be generated, the generated control information may be transmitted by the second protocol of the transport layer, the data to be transmitted by the protocol of the session layer may be controlled so as to allocate the data in accordance with each of operation states through a plurality of communication routes, the data may be received by the reception apparatus by the protocol of the transport layer, the control information including port numbers of used port count for reproducing the data may be received by the second protocol of the transport layer, and the data may be reproduced on the basis of the control information as the data received by the protocol of the session layer.

The transmission apparatus, the reception apparatus, or the communication system according to the invention may be either standalone or blocks that execute transmission processing and reception processing respectively.

As described and according to the invention, the communication that is fast and stable can be realized.

BRIEF DESCRIPTION OF THE DRAWINGS

FIG. 18 is a flowchart indicative of the processing of transmitting and receiving data through a plurality of UDP ports in a round-robin manner;

DESCRIPTION OF THE PREFERRED EMBODIMENTS

Figure 1:
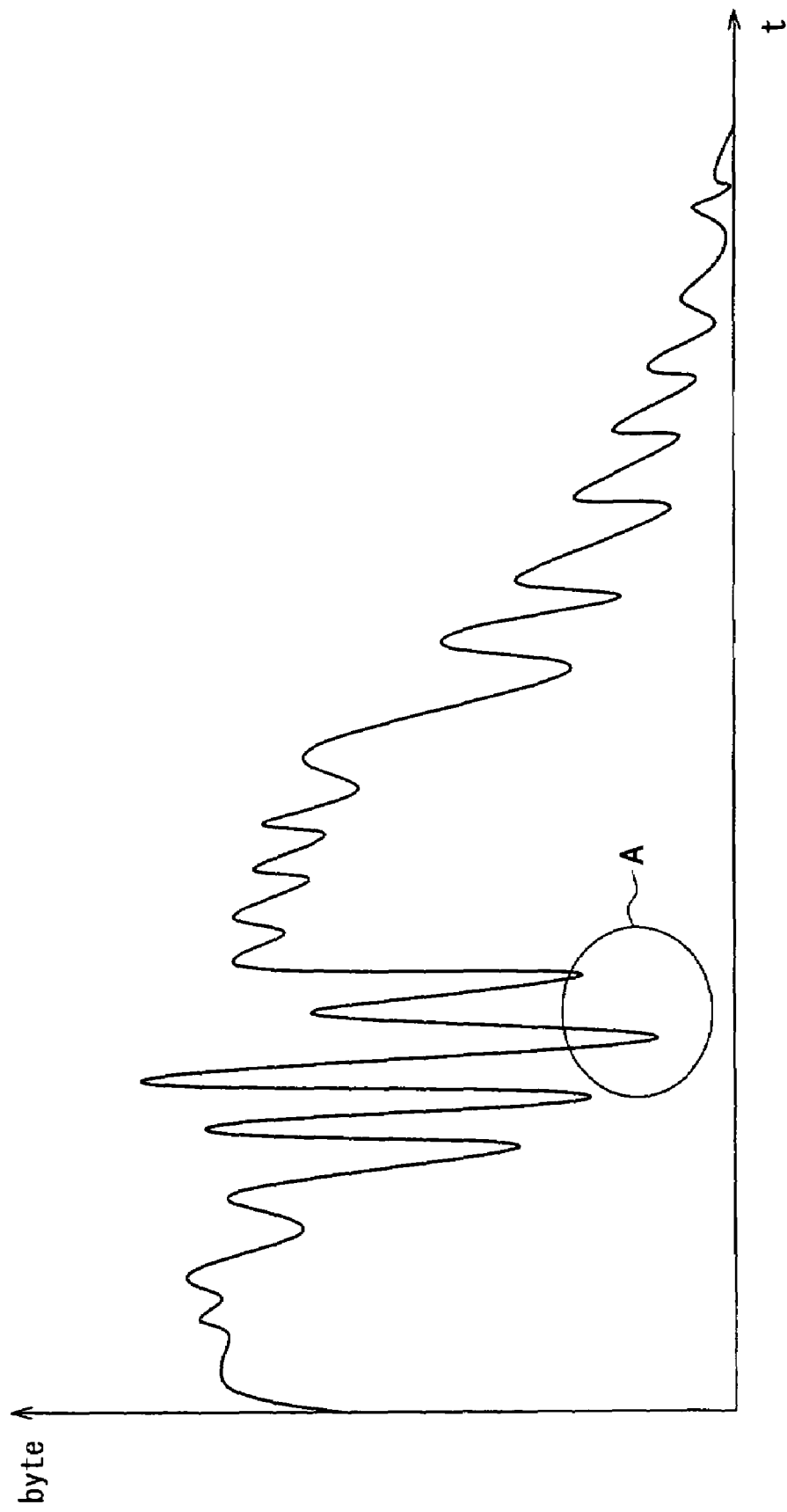
FIG. 1 is a graph for explaining congestion.

The following describes embodiments of the present invention. The correlation between the invention described herein and the embodiments of the invention is as follows. The description herein is intended to make confirmation that the embodiments for supporting the present invention described herein are described herein. Consequently, if there is an embodiment which is included in the embodiments of the present invention but not described herein as corresponding to the invention, it does not mean that such an embodiment does not correspond to the present invention. Conversely, if an embodiment is described herein as corresponding to the invention, it does not mean that such an embodiment does not correspond to other inventions than the present invention.

Further, the description herein does not mean the entire invention described herein. In other words, this description does not exclude any invention that is the invention herein but not claimed herein, namely, the invention that will be divisionally applied or appear or added by amendment in the future.

To be more specific, a transmission apparatus according to the invention includes: a plurality of first transmission units (UDP ports 87 through 89 shown in FIG. 4, for example) for transmitting data by a first protocol of a transport layer; a generation unit (a multi-flow RTP 83 shown in FIG. 4, for example) for generating control information for reproducing the data, the control information including port numbers and a used port count of the plurality of first transmission units; a second transmission unit (a TCP port 86 shown in FIG. 4, for example) for transmitting, by a second protocol of the transport layer, the control information generated by the generation unit; and a control unit (an RTCP 84 shown in FIG. 4, for example) for controlling data to be transmitted by a protocol of a session layer such that the data is allocated to the plurality of first transmission units in accordance with each of operation states and the allocated data is transmitted.

The transmission apparatus further includes a division unit (a multi-flow RTP 83 shown in FIG. 4, for example) for dividing the data to be transmitted by the protocol of the session layer into a plurality of pieces of data, in which the control unit controls the plurality of pieces of data obtained by the division unit such that the data is allocated to the plurality of first transmission units in accordance with each of operation states by the first protocol of the transport layer.

A transmission method according to the invention includes: a plurality of first transmission steps (the processing of step S16 shown in the flowchart of FIG. 7, for example) for transmitting data by a first protocol of a transport layer; a generation step (the processing of step S14 in the flowchart of FIG. 7, for example) for generating control information for reproducing the data, the control information including port numbers and a used port count of the plurality of first transmission steps; a second transmission step (the processing of step S15 in the flowchart of FIG. 7, for example) for transmitting, by a second protocol of the transport layer, the control information generated by the generation step; and a control step (the processing of step S16 in the flowchart of FIG. 7, for example) for controlling data to be transmitted by a protocol of a session layer such that the data is allocated to the plurality of first transmission steps in accordance with each of operation states by the plurality of first transmission steps.

A reception apparatus according to the invention includes: a plurality of first reception units (UDP ports 67 through 69 shown in FIG. 4, for example) for receiving data by a first protocol of a transport layer; a second reception unit (a TCP port 66 shown in FIG. 4, for example) for receiving control information for reproducing the data by a second protocol of the transport layer, the control information including port numbers and a used port count of the plurality of first reception units; and a reproduction unit (a multi-flow RTP 63 shown in FIG. 4, for example) for reproducing, as data received by a protocol of a session layer, the data on the basis of the control information.

A reception method according to the invention includes: a plurality of first reception steps (the processing step S6 in the flowchart of FIG. 7, for example) for receiving data by a first protocol of a transport layer; a second reception step (the processing of step S4 in the flowchart of FIG. 7, for example) for receiving control information for reproducing the data by a second protocol of the transport layer, the control information including port numbers and a used port count of the plurality of first reception steps; and a reproduction step (the processing of step S7 in the flowchart of FIG. 7, for example) for reproducing, as data received by a protocol of a session layer, the data on the basis of the control information.

It should be noted that the recording medium, the program, and the communication system according to the invention have the same correlation as that of the above-described transmission apparatus and method and the reception apparatus and method, so that the description of the correlation of the recording medium, the program, and the communication system is omitted.

Figure 2:
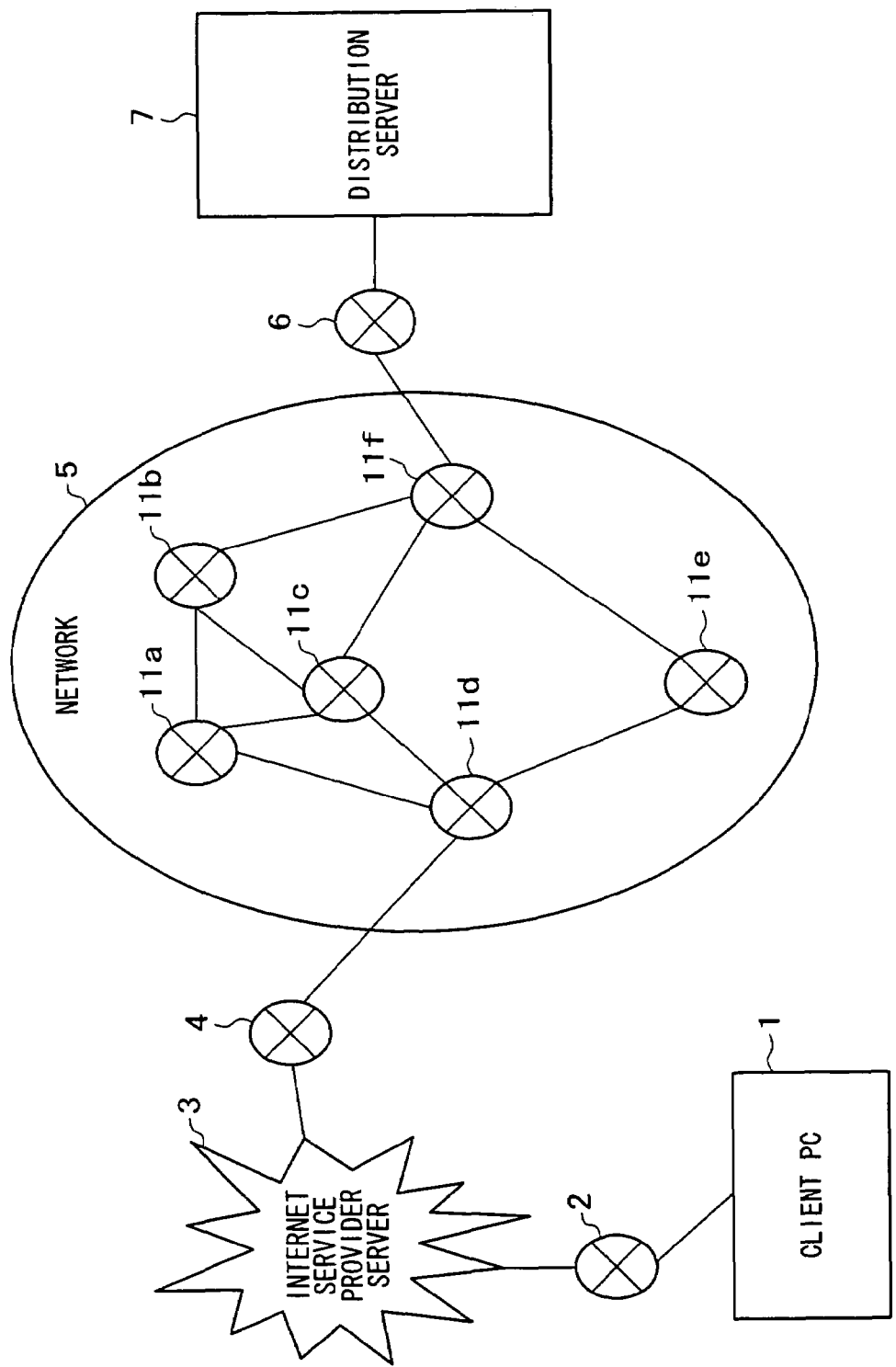
FIG. 2 is a schematic diagram illustrating a distribution system practiced as one embodiment of the invention.

Now, referring to FIG. 2, there is shown a schematic diagram illustrating a distribution system practiced as one embodiment of the invention.

The distribution system according to the invention shown in FIG. 2 distributes stream data from a distribution server 7 to a client PC 1 when a request for the distribution of the stream data received from the client PC 1.

The client PC 1 requests for the distribution of stream data, through a home router 2, a particular Internet service provider 3, by specifying its URL (Universal Resource Locator) for example to a distribution server 7. If there receives the distribution of stream data, the client PC 1 acquires the stream data from the Internet service provider 3 through the home router 2 and reproduces the received stream data.

The home router 2 (hereafter also simply referred to as a router 2) interconnects different networks. To be more specific, the router 2 relays the communication routes up to the network of the transmission destination by looking up a routing table in which communication routes are listed. The router 2 operates on the network layer or higher of OSI (Open Systems Interconnection) reference model (also called OSI layer model), so that the operation of the router 2 is dependent on network protocols. The router 2 has various types; some routers are of types compatible with TCP/IP (Transmission Control Protocol/Internet Protocol), IPX/SPX (Internetwork Packet Exchange/Sequenced Packet Exchange), AppleTalk (trademark), and SNA (Systems Network Architecture), and so on. These routers are generally called multi-protocol routers. In addition, the router 2 executes flow control and congestion control as described above.

The Internet service provider 3 is administered and operated by a communication common carrier that provides Internet connection services. The Internet is accessible for those educational institutions, organizations, businesses that have servers of their own, by means of LANs (Local Area Networks). Internet service providers allow businesses or persons who do not own servers of their own to access the Internet through the public servers arranged by the Internet service providers.

In response to a request from the client PC 1, the Internet service provider 3 requests the distribution server 7 specified by its URL for stream data through a network 5 typified by the Internet. Also, the Internet service provider 3 obtains the stream data distributed from the distribution server 7 through a router 4 in response to the request and supplies the received stream data to the client PC 1.

The router 4 and a router 6 are the same as the router 2. The router 4 mainly interconnects the Internet service provider 3 and the network 5 and the router 6 interconnects the distribution server 7 and the network 5, thereby forming a communication route.

The network 5 consists of a plurality of routers 11a through 11f, which form communication routes between them. Each of the routers 11a through 11f is basically the same as the router 2. It should be noted that, in FIG. 2, routers 11a and 11b are interconnected, routers 11a and 11c are interconnected, routers 11a and 11d are interconnected, routers 11b and 11c are interconnected, routers 11b and 11f are interconnected, routers 11c and 11d are interconnected, routers 11c and 11f are interconnected, routers 11d and 11e are interconnected, and routers 11e and 11f are interconnected, thereby forming communication routes. It is also practicable that routers 11a through 11f be interconnected a manner other than described above or the number of routers other than the above-mentioned routers may form the network 5. In addition, if there is no need to especially make distinction among the routers 11a through 11f, these routers may be generically referred to as a router 11, the same holds with other configurations.

The distribution server 7 distributes stream data requested by the client PC 1 to the requesting client PC 1 through the Internet service provider 3 and the network 5.

Figure 3:
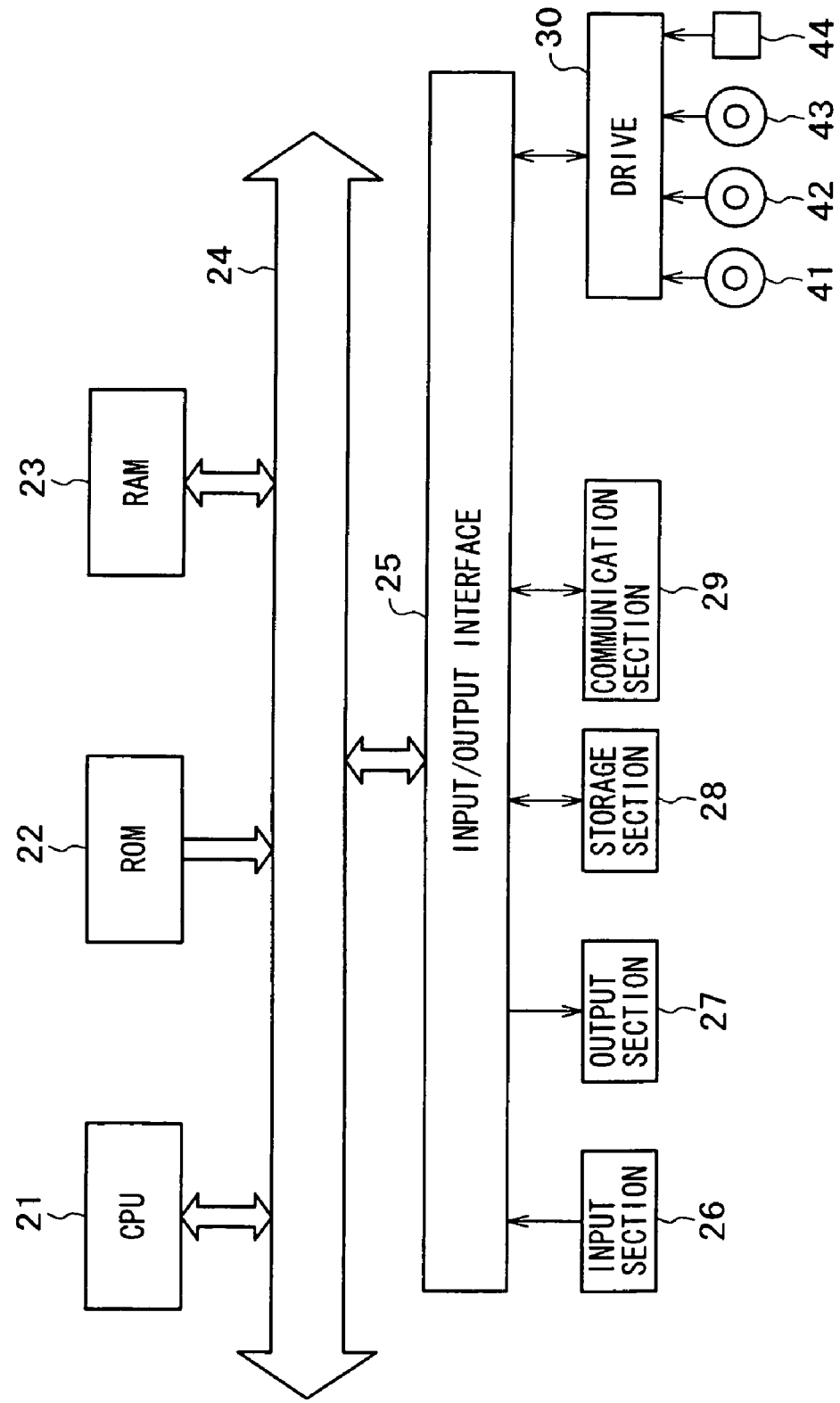
FIG. 3 is a block diagram illustrating a configuration of a client PC shown in FIG. 2.

The following describes a configuration of the client PC 1 with reference to FIG. 3.

A CPU (Central Processing Unit) 21 executes various processing operations as instructed by programs stored in a ROM (Read Only Memory) 22 or a storage section 28. A RAM (Random Access Memory) 23 stores programs to be executed by the CPU 21 and data necessary for the execution, from time to time. The CPU 21, the ROM 22, and the RAM 23 are interconnected through a bus 24.

The CPU 21 is connected with an input/output interface 25 through the bus 24. The input/output interface 25 is connected with an input section 26 having a keyboard, a mouse, and a microphone for example, and an output section 27 having a display and a speaker for example. The CPU 21 executes various processing operations in accordance with commands inputted from the input section 26.

The storage section 28 that is connected to the input/output interface 25 stores programs and various kinds of data in which the CPU 21 executes necessary for the execution thereof based on a hard disk drive, for example. A communication section 29 is a modem for example and transmits and receives various kinds of data with devices having communication capabilities through a network, not shown.

A drive 30 connected to the input/output interface 25 drives a magnetic disk 41, an optical disk 42, a magneto-optical disk 43, or a semiconductor memory 44 when it is mounted thereon, acquiring programs and data recorded to the loaded recording medium. The acquired programs and data are transmitted to the storage section 28 as required to be stored therein.

It should be noted that the configurations of the Internet service provider 3 and the distribution server 7 are basically the same as the configuration of the client PC 1, so that their description is omitted. However, in order to achieve functions to be described later, the programs that are stored in the ROM 22, the storage section 28, and the magnetic disk 41, the optical disk 42, the magneto-optical disk 43, or the semiconductor memory 44 loaded on the drive 30 in the Internet service provider 3 and the distribution server 7 may be different from those in the client PC 1 or the processing speed of the CPU 21 and the storage sizes of RAM 23 and the storage section 28 may be changed in accordance with the processing to be executed.

The following describes functions which are realized by the client PC 1 and the distribution server 7 having the similar configuration described with reference to FIG. 3. It should be noted that, with reference to FIG. 4, the illustration of the routers 2, 4, 6, and 11, the Internet service provider 3, and the network 5 are omitted but these components are supposed to exist on the communication route.

A player 61 is a program for controlling the reproduction of stream data. The player 61 is operated by the user when specifying or stopping the reproduction of predetermined stream data through GUI (Graphical User Interface) for example. When these operations are performed, the player 61 supplies corresponding commands such as reproduction and stop commands to an RTSP (Real Time Streaming Protocol) 62 to transmit these commands to the distribution server 7 through a TCP (Transmission Control Protocol) port 65, temporarily stores, as required, the distributed stream data to be received by a multi-flow RTP 63 in accordance with the above-mentioned commands, and reproduces the stored stream data (namely, temporarily stores, by a cache function, the data received as required, reads the stored data with a bit rate suitable for reproduction, and reproduces the data).

The RTSP 62 controls the distribution of realtime stream data and supplies control commands such as reproduction and stop commands supplied from the player 61 to the distribution server 7 through the TCP port 65.

Also, the RTSP 62 executes the negotiation of a stream data transmission protocol by the transport header field (the field for use in the negotiation of the data transmission protocol in the setup method) in a setup method (a procedure for the negotiation necessary for transmission stream data between the distribution server 7 and the client PC 1). At this moment, the RTSP 62 specifies RTP/UDP as the transmission protocol, in which the RTSP 62 specifies, as client_port parameter and server_port parameter, a range of the UDP ports (in FIG. 4, UDP ports 67 through 69) which are used by the multi-flow RTP 63 and an RTCP 64.

The multi-flow RTP 63 is a protocol for transmitting stream data by a plurality of flows. A flow herein denotes a unit of data transmission which is defined by the IP addresses of transmission source and transmission destination, the transport protocol used, and a combination of ports. A flow also denotes a unit in which a general-purpose router executes control of forward priority.

The multi-flow RTP 63 controls the UDP ports 67 through 69 specified by the RTSP 62 to acquire the stream data transmitted to the UDP port 67 through 69 in a divided manner. Also, the multi-flow RTP 63 acquires such control information for reconstruct the divided data by assembly (or combination) as the transmission sequence and arrangement of the divided stream data supplied from the distribution server 7 through the TCP 66 and the RTCP 64. Further, the multi-flow RTP 63 combines the stream data received in a divided manner on the basis of the control information obtained through the RTCP 64 and supplies the combined original stream data to the player 61.

A distribution program 81 of the distribution server 7 receives a command for reproducing specified stream data or stopping the reproduction from the client PC 1 through a TCP port 85 and supplies a corresponding command to the RTSP 82.

An RTSP 82 basically corresponds to the RTSP 62 of the client PC 1. In the distribution server 7, on the basis of the command for reproduction or stop of the stream data specified by the distribution program 81, the RTSP 82 specifies the address of the stream data specified for reproduction of stop and supplies the specified address to the multi-flow RTP 83. Also, the RTSP 82 specifies RTP/UDP as the transmission protocol, in which the RTSP 82 specifies, as client_port parameter and server_port parameter, a range of UDP ports (in FIG. 4, UDP ports 67 through 69) which are used by the multi-flow RTP 83 and the RTCP 84.

The multi-flow RTP 83 basically corresponds to the multi-flow RTP 63 of the client PC 1. The multi-flow RTP 83 reads the stream data addressed by the RTSP 82, divides the stream data so as to be transmitted through UDP ports 87 through 89, supplies the divided stream data thereto, and at the same time, generates information for reconstruct the divided stream data and control information including the port number of any of the UDP ports 87 through 89 and the number ports used (or the used port count), supplying these pieces of information to the RTCP 84.

To be more specific, if the stream data to be transmitted in one session is divided so as to correspond to UDP ports 87 through 89, the control information includes the information indicative of the sequence of the division of the data of each of sequence numbers attached to the divided data, namely indicative of the sequence of the reconstruction of the divided data and the port numbers for identifying any of the UDP ports 87 through 89 for use in the communication and the number of used ports.

When actually transmitting data through a plurality of UDP ports 87 through 89, the multi-flow RTP 83 monitors the operation state (the state of writing to socket) of each UDP port and allocates the divided data to the UDP ports in accordance with the operation states thereof, transmitting the divided data therethrough. This allocation of divided data is executed in one of a round-robin method and a no-delay method. In the round-robin method, divided data is allocated to a plurality of UDP ports in a predetermined sequence and the allocated divided data is transmitted through the UDP ports. In the no-delay method, divided data is allocated to any of a plurality of UDP ports that is writable regardless of the sequence of the UDP ports and the divided data is transmitted through that UDP port. Any one of these methods may be used in a fixed manner or in a selectable manner. Obviously, any other methods than these two methods may be used.

The RTCP 84 is basically the same as the RTCP 64 of the client PC 1. The RTCP 84 controls UDP ports 87 through 89 on the basis of the control information supplied from the multi-flow RTP 63 to supply stream data to the client PC 1 and, at the same time, controls the TCP port 86 to transmit the supplied control information to the client PC 1.

Figure 4:
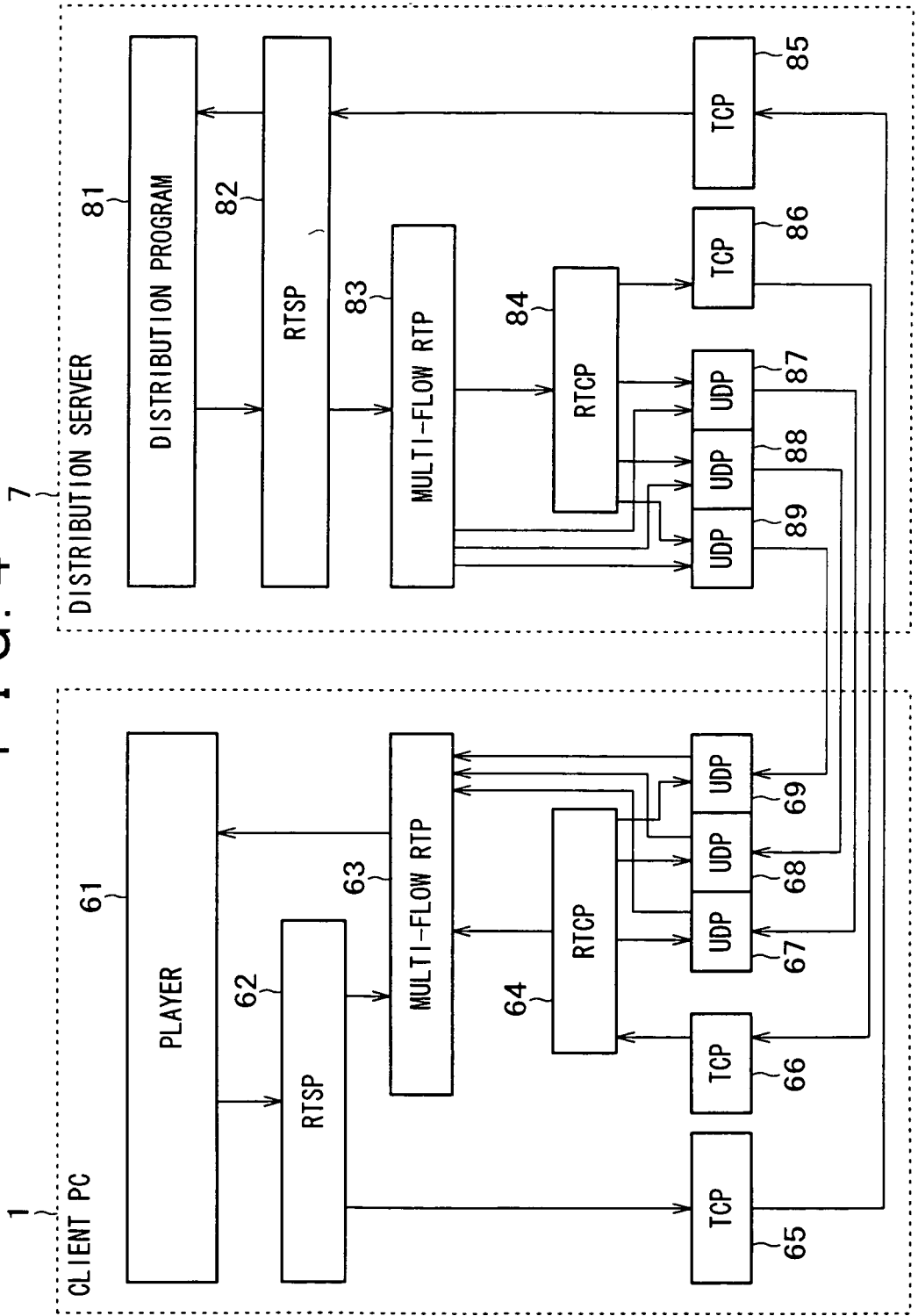
FIG. 4 is a schematic diagram illustrating functions that are realized by the client PC and a distribution server shown in FIG. 2.
Figure 5:
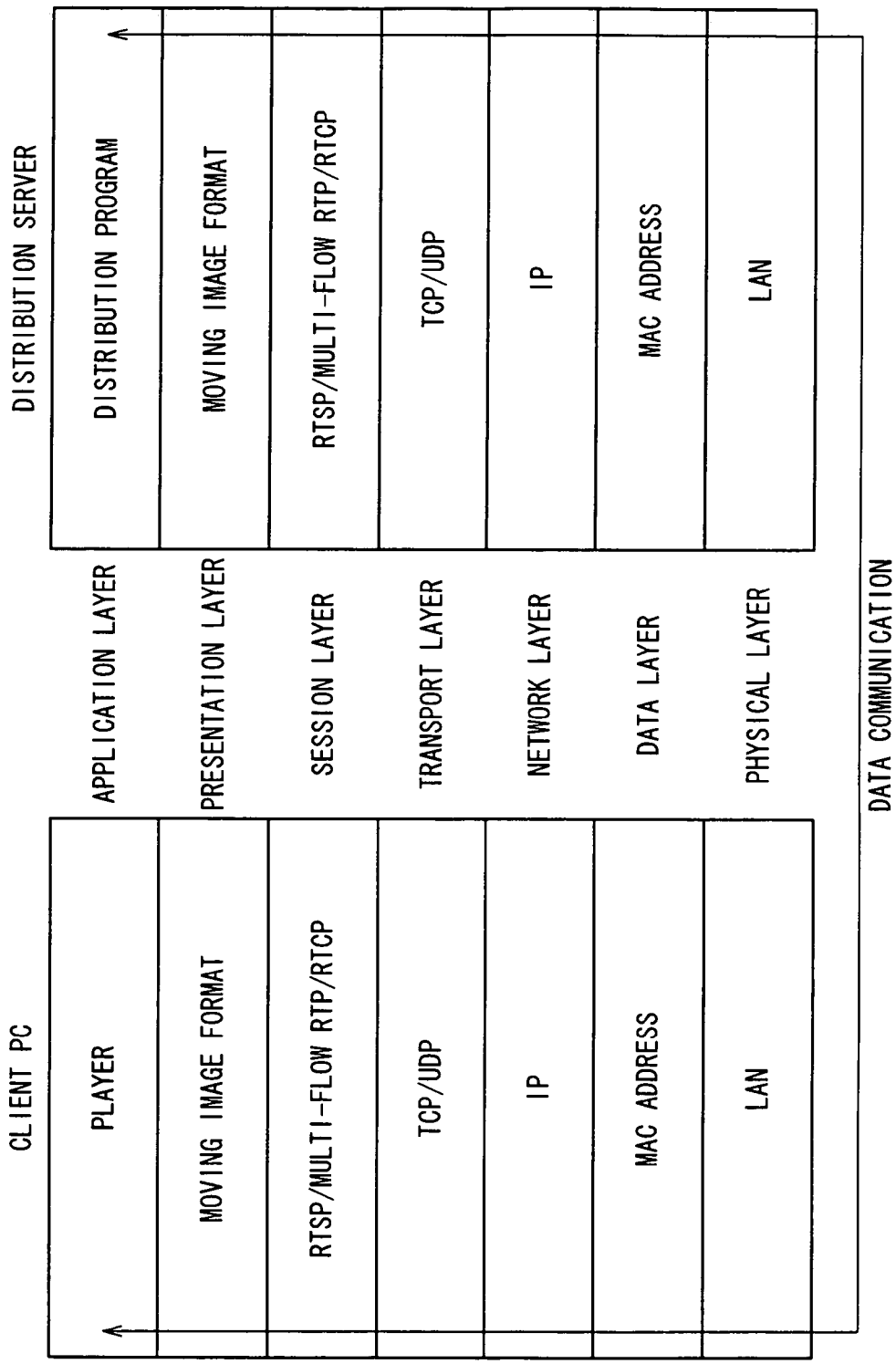
FIG. 5 is a schematic diagram illustrating an OSI reference model.

The player 61, the RTSP 62, the multi-flow RTP 63, the RTCP 64, the TCP ports 65 and 66, the UDPs 67 through 69, as well as the distribution program 81, the RTSP 82, the multi-flow RTP 83, the RTCP 84, the TCP ports 85 and 86, and the UDPs 87 through 89 shown in FIG. 4 are each a protocol. As shown in FIG. 5, these protocols are classified as follows by the OSI reference model.

Namely, the player 61 and distribution program 81 belong to the application layer, specifying applications that are visible by the user who operates the client PC 1 and the distribution server 7. If stream data is moving image data for example, the moving image format thereof provides the presentation layer, specifying the format and code in communication.

The RTSP 62, the multi-flow RTPs 63 and 83, and RTCPs 64 and 84 belong to the session layer, specifying a procedure of communication as protocols. The TCP ports 65, 66, 85, and 86 as well as the UDP ports 67 through 69 and 87 through 89 belong to the transport layer, specifying a logical communication route.

IP (Internet Protocol) of TCP/IP provides the network layer that specifies a communication route through a network. MAC (Media Access Control) address, which is a physical address of each device, provides the data layer that specifies a logical signal procedure (for example, a packetizing procedure) between physically adjacent devices. The physical layer is provided by LAN for example that is a physical, electrical connection.

Figure 6:
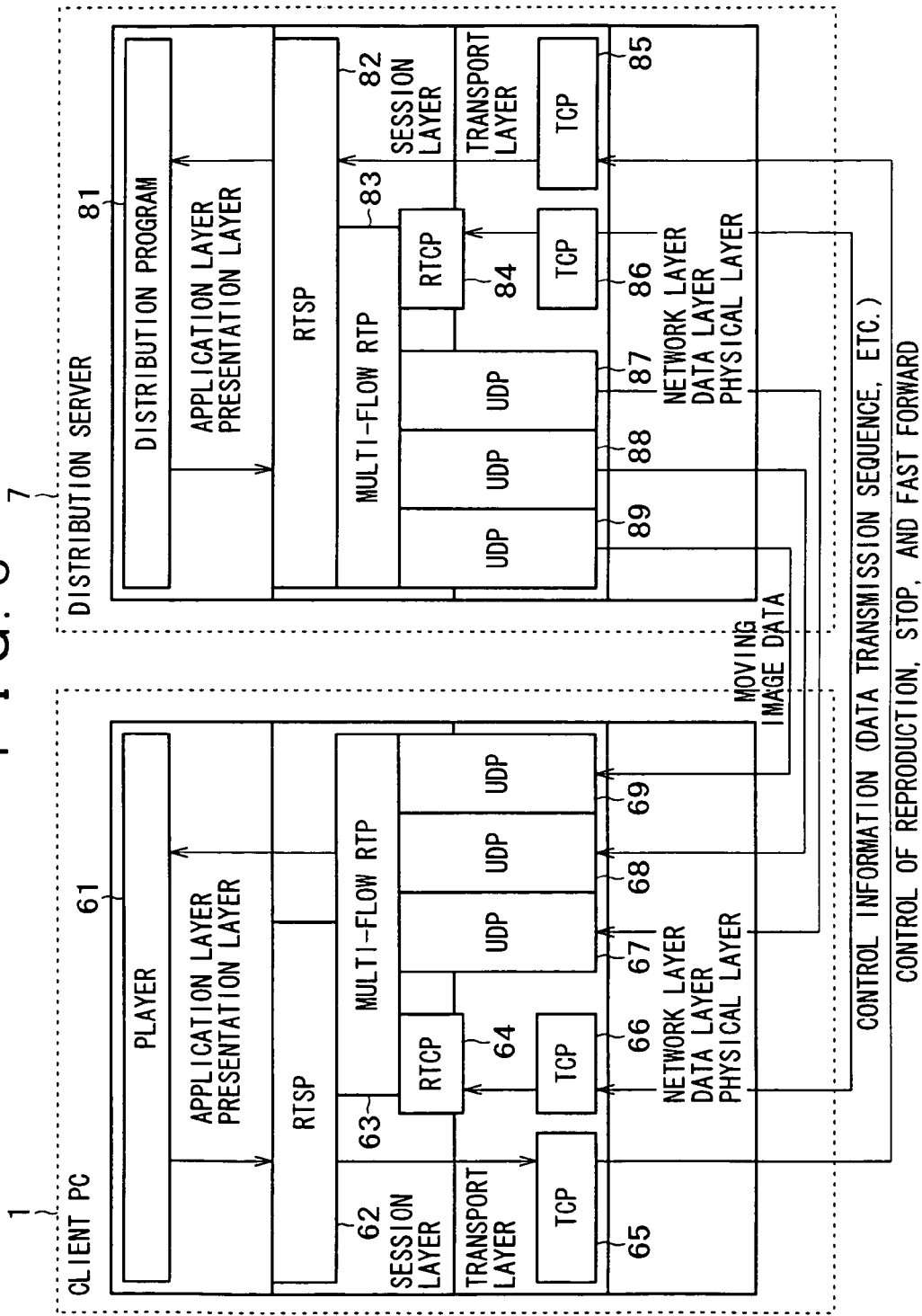
FIG. 6 is a schematic diagram illustrating the functions that are realized by the client PC and the distribution server shown in FIG. 4 as corresponding to the OSI reference model.

FIG. 6 illustrates the arrangement of the functions shown in FIG. 4 in the above-mentioned layers on the basis of the OSI reference model described with reference to FIG. 5. Referring to FIG. 6, each overlapped portion or contact portion between the blocks indicates that the upper block in the figure is in control of the lower block in the figure and each arrow indicates data transmission direction.

To be more specific, the RTSPs 62 and 82 control the multi-flow RTPs 63 and 83 of the session layer and control the TCP ports 65 and 85 of the transport layer. The multi-flow RTPs 63 and 83 control the RTCPs 64 and 84 of the session layer. The RTCPs 64 and 84 of the session layer control the UDPs 67 through 69 and 87 through 89 of the transport layer and the TCPs 66 and 86 of the transport layer. At this moment, the UDP port of the distribution server 7 and the UDP port of the client PC 1 transmit and receive data in a pair. Namely, referring to FIG. 6, the UDPs 67 and 87 are paired, the UDPs 68 and 88 are paired, and the UDPs 69 and 89 are paired, each pair transmitting and receiving data.

The above-mentioned functions allow the transmission of stream data to be transmitted in one session through a plurality of ports. Now it is defined here that the maximum unit in which the streaming transmission by the multi-flow RTPs 63 and 83 be "RTP session" and the unit in which data is transmitted or received through a pair of transmission destination port and transmission source port (in FIG. 6, UDP ports 67 and 87, UDP ports 68 and 88, or UDP ports 69 and 89) belonging to a certain RTP session be "RTP data flow".

In this case, each RTP data flow in the multi-flow RTPs 63 and 83 is compliant with the RTP data transmission protocol of RFC 1889. The RTCPs 64 and 84 do not execute control in the RTP data flow unit in which data is transmitted or received through a pair of UDP ports; instead, the RTCPs 64 and 84 control the entire RTP session by regarding the UDP ports 67 through 69 and the UDP ports 87 through 89 as one port.

At this moment, the multi-flow RTPs 63 and 83 assigns the sequence numbers of RTP data packets not in the RTP data flow unit but in the RTP session unit, thereby uniquely managing the data packets by their sequence numbers even through these data packets have been transmitted in different RTP data flows.

In the normal RTP, the stream data source is identified by SSRC (Synchronization Source: a 32-bit field for the source identification of stream data packets in RTP). The multi-flow RTP 83 makes SSRC correspond to RTP session one to one. This allows the multi-flow RTP 63 to integrate a plurality of RTP data flows into one RTP session and, if the data belonging to a plurality of RTP sessions have been received through the same UDP port, sort these data properly.

It should be noted that each UDP port of the RTP data flow is allocated in a continuous port range in principle; it is also practicable to allocate only even-numbered ports in the continuous port range in accordance with the RFC 1889 protocol.

Figure 7:
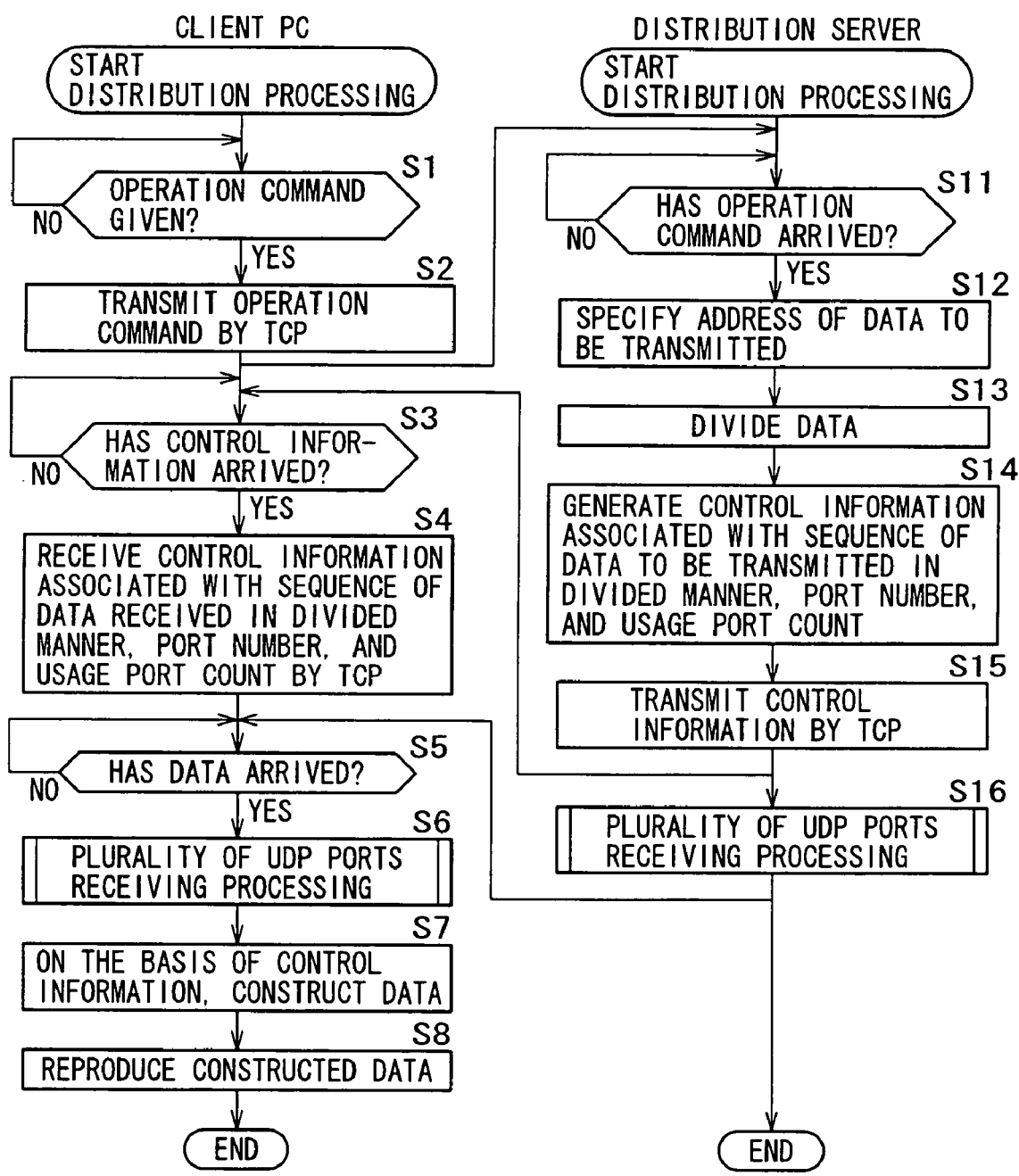
FIG. 7 is a flowchart indicative of the distribution processing by the functions shown in FIG. 4.

The following describes the processing of distributing stream data by the client PC 1 and the distribution server 7 shown in FIG. 4, with reference to FIG. 7.

In step S1, the player 61 determines whether or not an operation for requesting the distribution of predetermined stream data has been done by operating the input section 26 and repeats this processing until such an operation is executed. If the user is found to have requested the data distribution by operating the input section 26, then the procedure goes to step S2.

In step S2, the player 61 supplies an operation command for requesting the distribution of stream data to the RTSP 62 to transmit the operation command to the distribution server 7 through the TCP port 65. Obviously, at this moment, the information about the request for the distribution of stream data is transmitted to the distribution server 7 through the router 2, the Internet service provider 3, the router 4, the network 5, and the router 6 in this order, as shown in FIG. 1. It should be noted that it is supposed that, subsequently, the data of the client PC 1 and the data of the distribution server 7 be transmitted or received along the same route, so that the description of the data transmission/reception at the router 2, the Internet service provider 3, the router 4, the network 5, and the router 6 will be omitted appropriately.

In step S11, the distribution program 81 determines whether or not the distribution of stream data has been requested by the client PC 1 from the RTSP 82 through the TCP port 85 and repeats this processing until the request for the distribution of stream data comes from the client PC 1. If the distribution of stream data is found in step S11 requested by the client PC 1 by the processing of step S2, then the distribution program 81 controls the RTSP 82 to supply the information for specifying the address at which the stream data to be distributed is stored to the multi-flow RTP 83.

In step S13, on the basis of the address information supplied from the RTSP 82, the multi-flow RTP 83 reads the stream data to be distributed, divides the stream data by the number corresponding to the UDP ports 87 through 89, supplies the divided stream data to the UDP ports 87 through 89, and, at the same time, generates the control information necessary for the reconstruction of the divided stream data, supplying the generated control information to the RTCP 84.

In step S14, the multi-flow RTP 83 generates the control information including the information necessary for the reconstruction of the divided stream data and the information about the port numbers of the UDP ports to be used for the communication and the used port count.

In step S15, the RTCP 84 controls the TCP port 86 to transmit the above-mentioned control information to the client PC 1.

In step S16, the processing of transmitting a plurality of UDP ports is executed, in which the RTCP 84 controls the UDP ports 87 through 89 to transmit, to the client PC 1, the stream data supplied as divided by the multi-flow RTP 83. It should be noted that this processing will be detailed later with reference to FIGS. 18 through 22.

In step S3, the multi-flow RTP 63 controls the RTCP 64 to inquire the TCP 66 to determine whether the control information including the information necessary for the reconstruction of the stream data that is received by the UDP ports 67 through 69 in a divided manner (for example, the information about the sequence for data reconstruction) and the information about the port numbers for identifying the UDP ports 67 through 69 to be used for the communication and the used port count has transmitted and repeat this processing until this control information receives. If, in step S3, the stream data is found transmitted by the processing of step S15 for example, then the procedure goes to step S4.

In step S4, the RTCP 64 controls the TCP port 66 to receive the above-mentioned control information and supply the received control information to the multi-flow RTP 63.

In step S5, on the basis of the information about the port numbers for use in the communication of the control information and the used port count, the RTCP 64 inquires the UDP ports 67 through 69 to determine whether or not the data has transmitted from the corresponding UDP ports 87 through 89 and repeats this processing until the data receives. If, in step S5, the data is found arrived by the processing of step S16 for example, the procedure goes to step S6.

In step S6, the processing of receiving a plurality of UDP ports is executed, in which, on the basis of port numbers for identifying UDP ports 67 through 69 for use in communication and used port count included in the control information, the RTCP 64 controls the UDP ports 67 through 69 to receive the transmitted divided stream data, which are supplied to the multi-flow RTP 63. It should be noted that this processing will be described later with reference to FIGS. 18 through 22.

In step S7, the multi-flow RTP 63 reconstructs the stream data received from each UDP port in a divided manner on the basis of the information necessary for stream data reconstruction included in the above-mentioned control data and supplies the reconstructed stream data to the player 61.

In step S8, the player 61 buffers, for a predetermined period of time, the received stream data reconstructed and supplied by the multi-flow RTP 63, thereby reproducing the original stream data.

Figure 8:
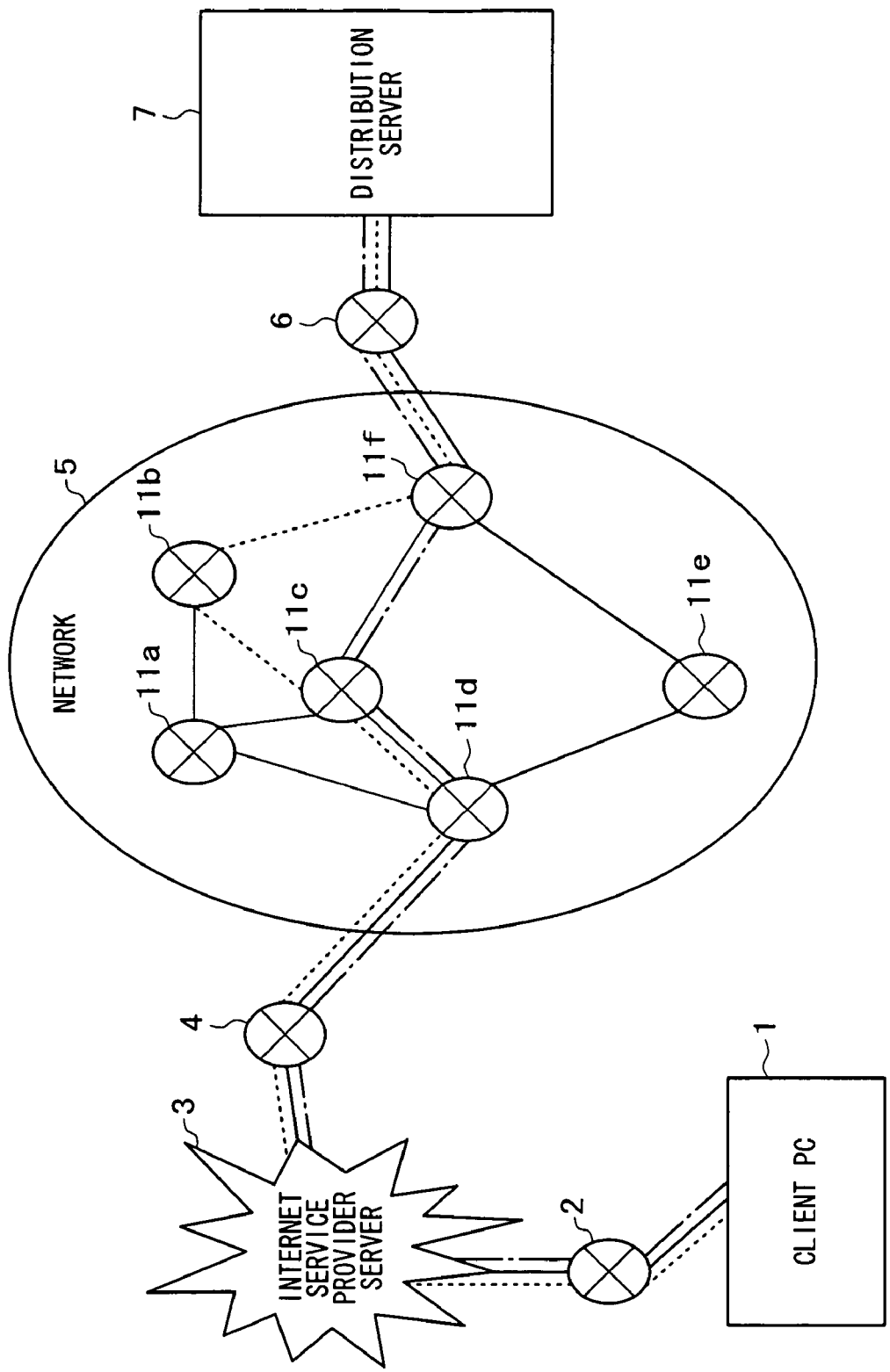
FIG. 8 is a schematic diagram illustrating distribution processing.

The above-mentioned sequence of processing operations transmit stream data in a divided manner through a plurality of UDP ports, so that stream data is distributed along a plurality of communication routes in a divided manner as shown in FIG. 8 for example, thereby making it practicable to transmit the entire stream data before a conventional congestion occurs as shown in FIG. 8.

Figure 9:
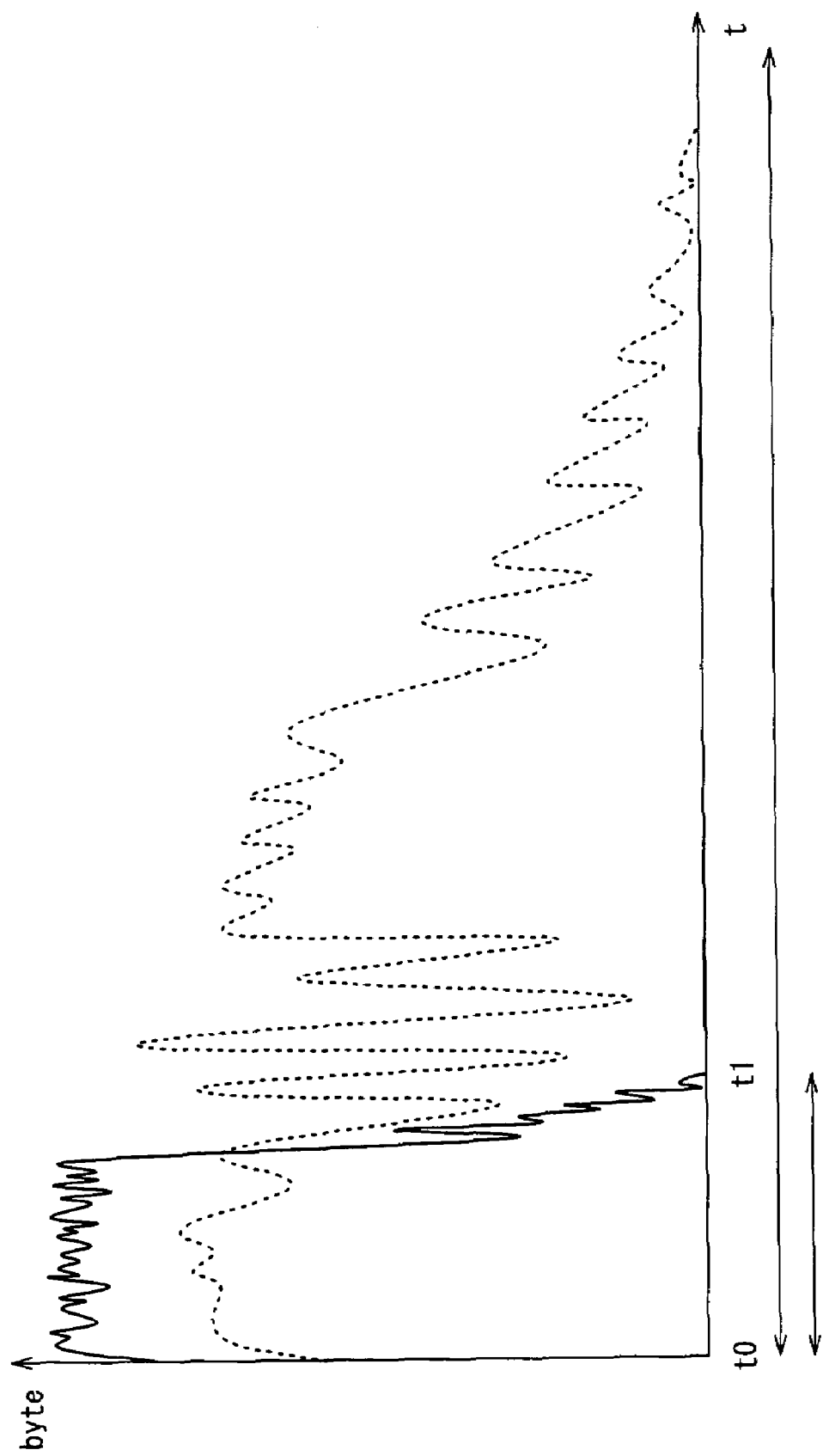
FIG. 9 is a graph for explaining data forwarding rates.

It should be noted that the RTP data flow through the pair of UDP ports 67 and 87 is indicated by thick solid lines, the RTP data flow through the pair of UDP ports 68 and 88 is indicated by thick dotted lines, and the RTP data flow through the pair of UDP ports 69 and 89 is indicated by thick dot-and-dash lines as shown in FIG. 6. Namely, the RTP data flow through the pair of UDP ports 67 and 87 runs through the routers 6, 11*f*, 11*e*, 11*d*, and 4, the Internet service provider 3, and the router 2; the RTP data flow through the pair of UDP ports 68 and 88 runs through routers 6, 11*f*, 11*b*, 11*c*, 11*d*, and 4, the Internet service provider 3, and the router 2; and the RTP data flow through the pair of UDP ports 69 and 89 runs through the routers 6, 11*f*, 11*c*, 11*d*, and 4, the Internet service provider 3, and the router 2, for example. Thus, by taking different communication routes, the band can be used widely, thereby realizing high-speed data transmission. Consequently, as shown in FIG. 9, the novel configuration is able to complete the transmission by the proximity of time 1*t* at which congestion occurs conventionally, thereby restraining the delay otherwise caused, which in turn realizes high-speed data communication. It should be noted that dashed lines indicate the conventional communication and solid lines indicate the data forwarding situation provided by the distribution system shown in FIG. 4. As seen from the figure, congestion occurs in the proximity immediately after exceeding time t1 shown in FIG. 9 in the conventional communication.

In the above-mentioned example, the stream data to be distributed by one session is divided and the divided stream data are transmitted through a plurality of RTP data flows. In the above-mentioned communication, communication is executed through the UDP ports, so that, if any of the routers on the communication routes discards packets due to flow control, the arrival of the transmitted data cannot be confirmed, possibly failing a multi-flow RTP with retransmission processing capability 101 to reconstruct the stream data. Therefore, if packets are discarded on the communication routes, the retransmission of dropped packets may be requested.

Figure 10:
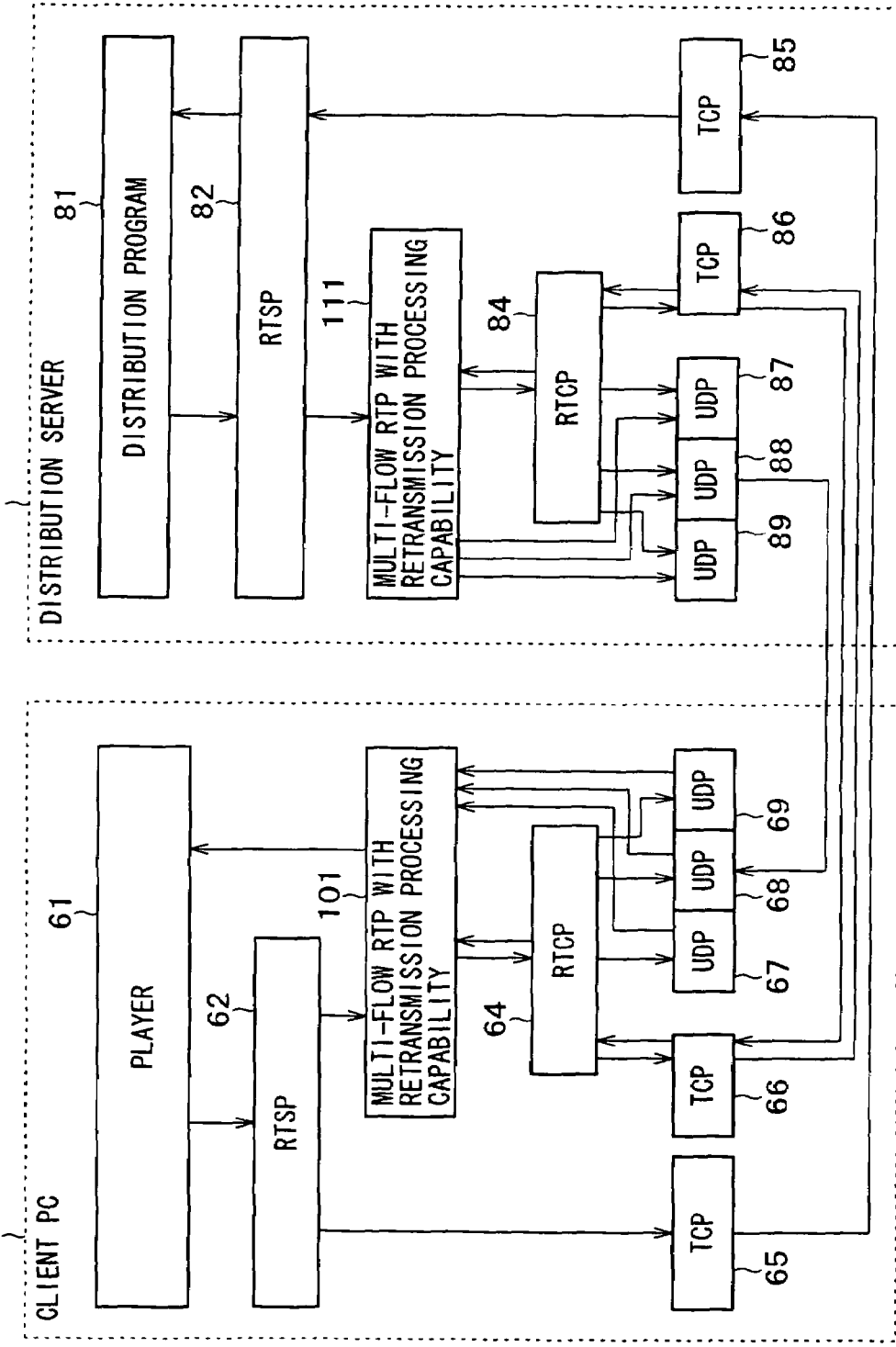
FIG. 10 is a schematic diagram illustrating other functions that are realized by the client PC and the distribution server shown in FIG. 2.

FIG. 10 illustrates functions for requesting the retransmission of dropped packets that are realized by the client PC 1 and the distribution server 7. It should be noted that, with reference to FIG. 10, functions similar to those previously described with reference to FIG. 4 are denoted by the same reference numerals. Therefore, their description is omitted.

In the client PC 1 and the distribution server 7 shown in FIG. 10, functions deferring from those of the client PC 1 and the distribution server 7 shown in FIG. 4 are that the multi-flow RTP with retransmission processing capability 101 and a multi-flow RTP with retransmission processing capability 111 are arranged in place of the multi-flow RTPs 63 and 83. The multi-flow RTP with retransmission processing capability 101, basically having the function of the multi-flow RTP 63, checks the divided stream data supplied from the UDP ports 67 through 69 for dropped data and, if dropped data is detected, controls the RTCP 64 to request the TCP port 66 for the retransmission of the dropped data. The multi-flow RTP with retransmission processing capability 111 controls the RTCP 84 to receive the retransmission request from the multi-flow RTP with retransmission processing capability 101 for requesting the retransmission from the TCP port 86 and then controls the plurality of UDP ports 87 through 89 to transmit the data (or the packets) requested for retransmission.

Figure 11:
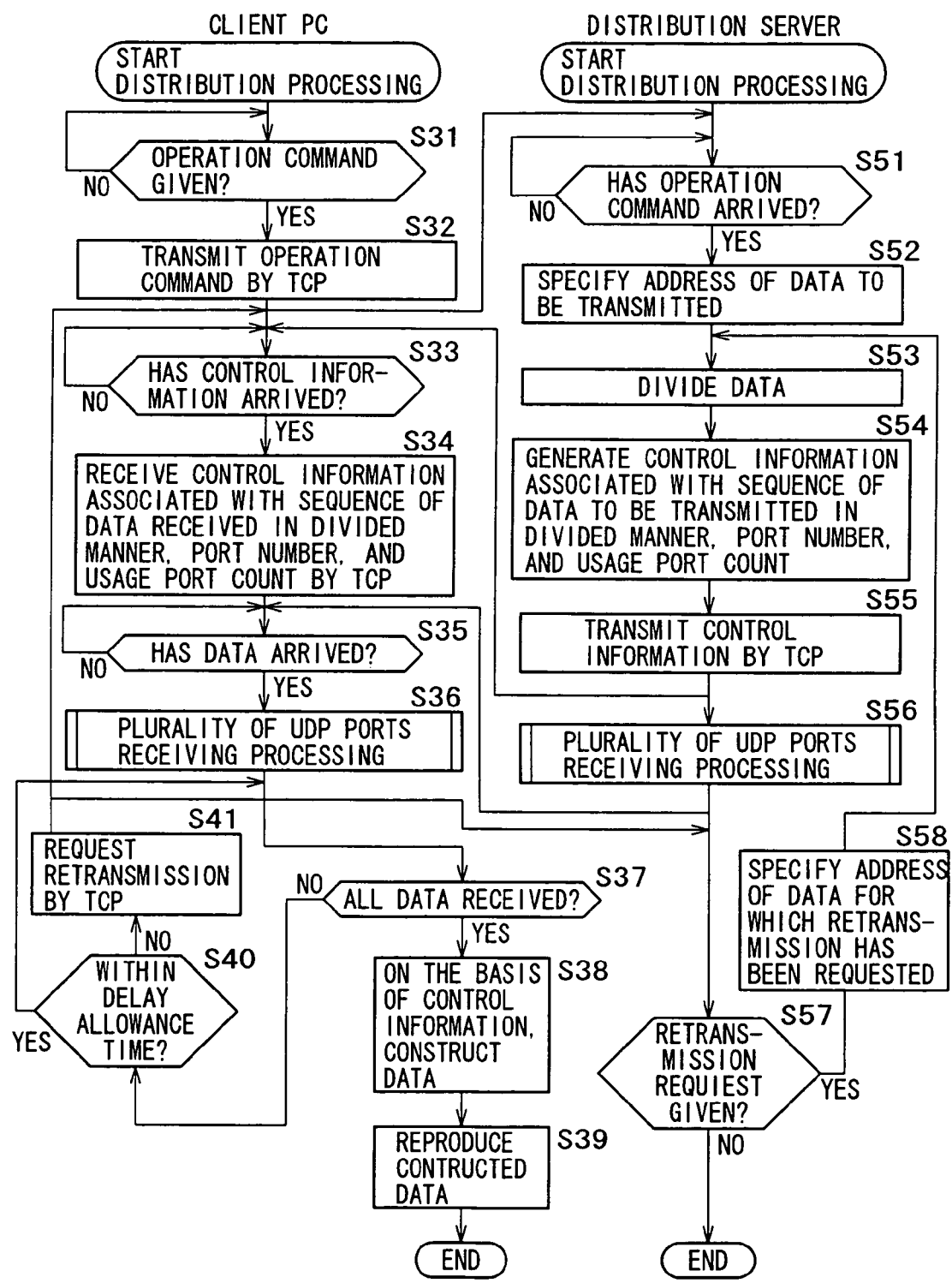
FIG. 11 is a flowchart indicative of the distribution processing by the functions shown in FIG. 10.

The following describes the distribution processing by the client PC 1 and the distribution server 7 shown in FIG. 10 with reference to the flowchart shown in FIG. 11. It should be noted that the processes of steps S31 through S36, S38, S39, and S51 through S56 in the flowchart shown in FIG. 11 are the same as steps S1 through S8 and S11 through S16, so that their description will be skipped.

Figure 12:
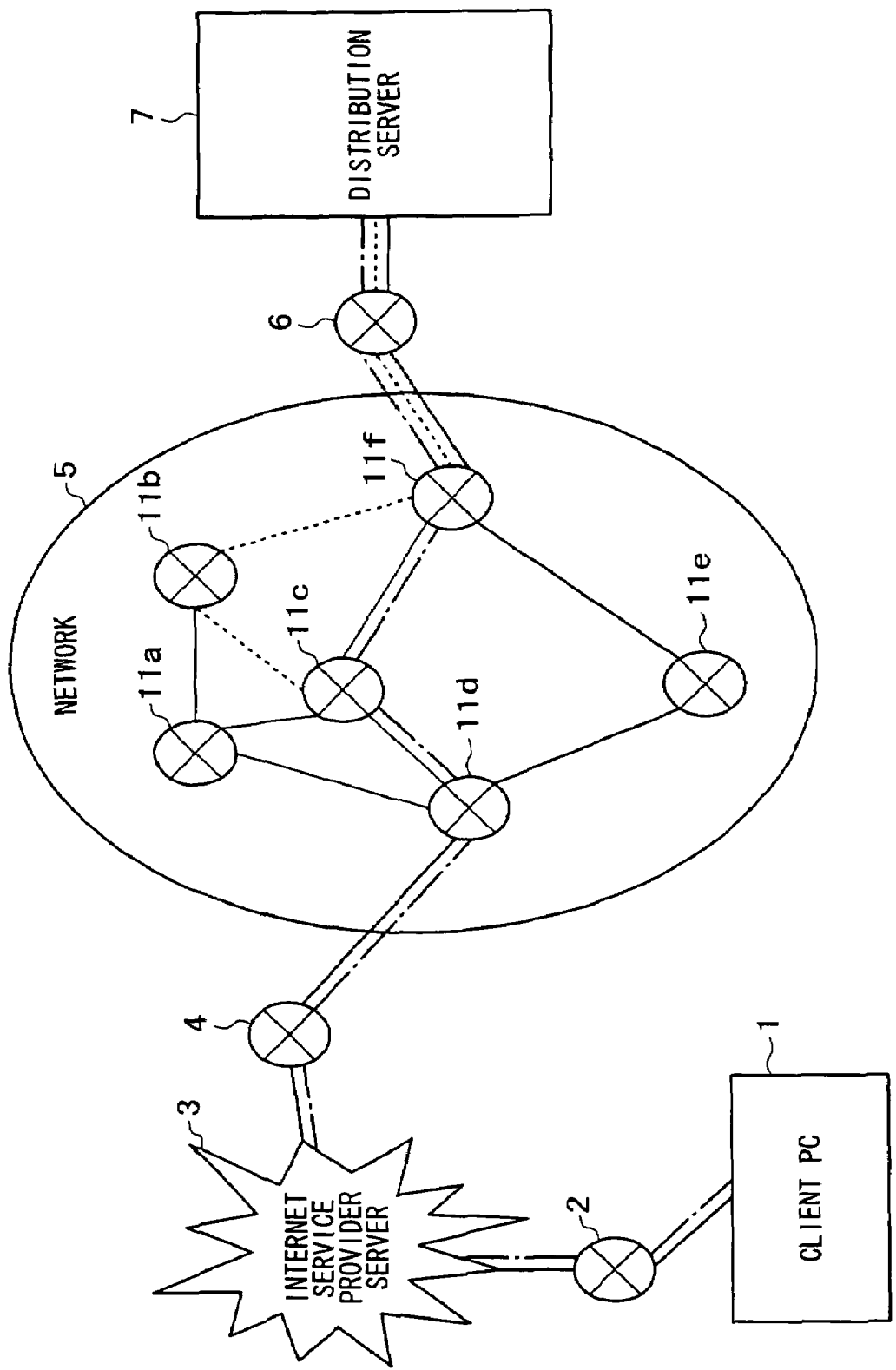
FIG. 12 is a schematic diagram illustrating the distribution processing by the functions shown in FIG. 10.

In step S37, on the basis of the control information supplied from the RTCP 64, the multi-flow RTP with retransmission processing capability 101 determines whether or not the data supplied from the UDP ports 67 through 69 has all been received without drop. For example, as shown in FIG. 12, if the data that should have been transmitted through the pair of UDP ports 68 and 88 has been discarded by the router 11c, then it is determined that data drop has occurred and therefore all the data has not been received, upon which the procedure goes to step S40.

In step S40, the multi-flow RTP with retransmission processing capability 101 determines whether or not the reception of data is within an allowed delay period. If the reception is found within the allowed delay period, the procedure returns to step S37. Namely, if the reception is found within the allowed delay period with all the data found not received, the processes of steps S37 and S40 are repeated within the allowed delay period. Then, if the reception is found out of the allowed delay period, the multi-flow RTP with retransmission processing capability 101 controls the RTCP 64 in step S41 to transmit, to the distribution server 7, a request for the retransmission of the dropped data from the TCP port 66, upon which the procedure returns to step S33 to repeat the above-mentioned processing operations therefrom. To be more specific, the sequence number of the dropped RTP data packets are specified to request for the retransmission.

In step S57, the multi-flow RTP with retransmission processing capability 111 controls the RTCP 84 to determine whether or not the retransmission request has been transmitted to the TCP port 86. If the retransmission request is found transmitted, by the processing of step S41 for example, then the procedure goes to step S58.

In step S58, the multi-flow RTP with retransmission processing capability 111 specifies the address of the data requested for retransmission (the address of the data corresponding to the sequence number of the data to be retransmitted), upon which the procedure returns to step S53 to repeat the above-mentioned processing operations therefrom.

If all data is found received in step S37, the procedure goes to step S38. If no retransmission request is found in step S57, this processing ends.

Figure 13:
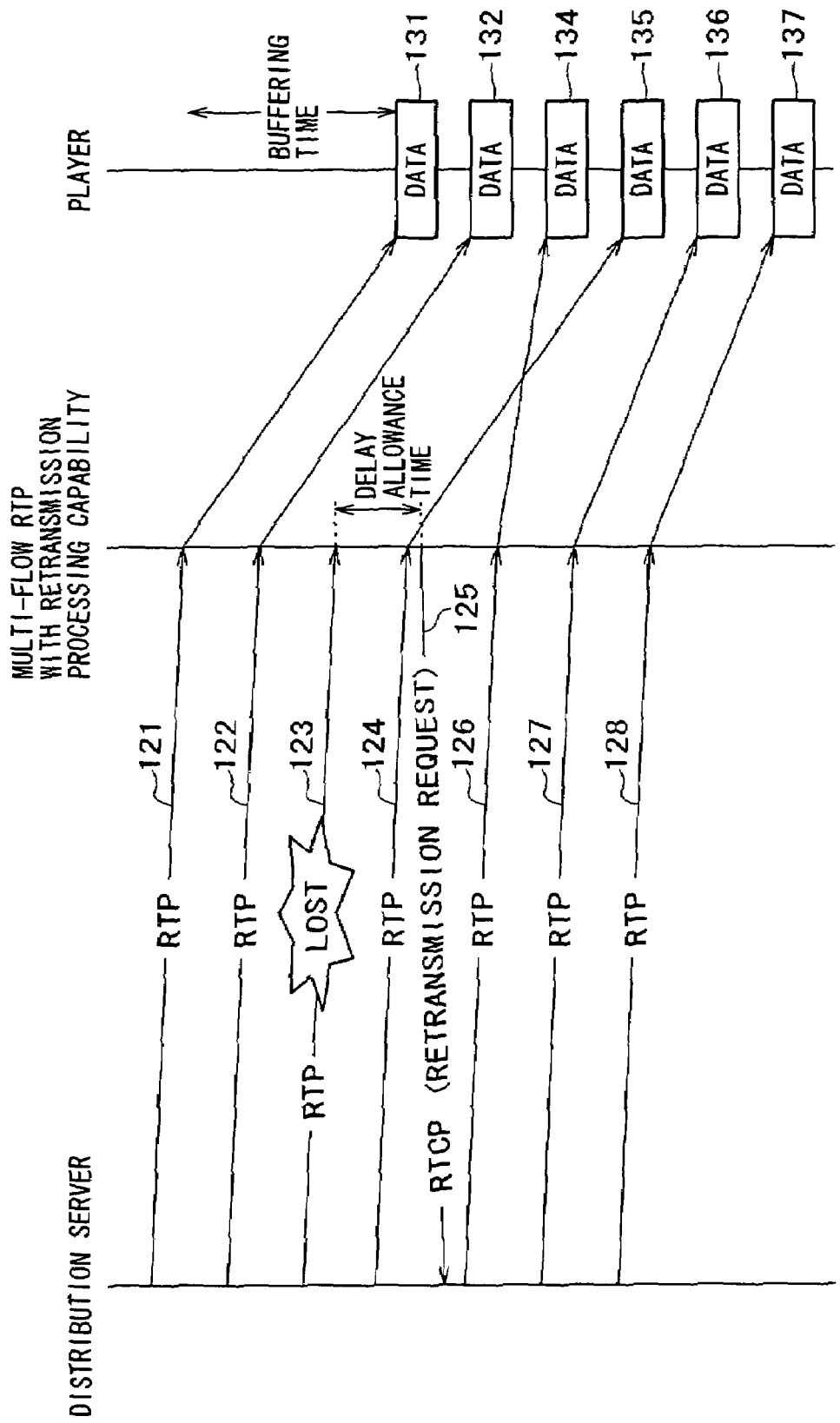
FIG. 13 is a schematic diagram illustrating the distribution processing by the functions shown in FIG. 10.

Namely, as shown in FIG. 13, when an RTP data flow 121 has been transmitted from the distribution server 7 through a plurality of pairs of UDP ports (for example, the pair of UDP ports 67 and 87, the pair of UDP ports 68 and 88, or the pair of UDP ports 69 and 89 shown in FIG. 6), the player 61 reproduces (after buffering the data for a predetermined period of time) data 131 through the processing of step S38 in the flowchart shown in FIG. 11. Likewise, in the client PC 1, when an RTP data flow 122 has been transmitted through a plurality of pairs of UDP ports, data 132 is reproduced.

However, as shown in FIG. 13, if an RTP data flow 123 is discarded by the router 11c on communication routes indicated by dotted lines as shown in FIG. 12 for example, the data for the discarded flow drops. Therefore, in this case, the corresponding data is not supplied to the player 61. In the example of FIG. 13, an RTP data flow 124 to be transmitted next is received and corresponding data 135 is buffered. If, during this period, the allowed delay period has passed since the drop of the data 123, the RTCP 64 controls the TCP port 66 through the processing of step S41 to request the retransmission.

Then, in response to this request, an RTP data flow 126 transmitted from the distribution server 7 and corresponding dropped data 134 is buffered, upon which the stream data is reproduced. In the example of FIG. 13, RTP data flows 136 and 137 subsequently come from the distribution server 7 and the corresponding data 136 and 137 are buffered, upon which the stream data is reproduced. It should be noted that this allowed delay period must be shorter than a time obtained by subtracting a predicted retransmission response time (namely, the predicted time until the data is transmitted in response to a retransmission request) from the buffering time.

The above-mentioned processing transmits stream data through a plurality of UDP ports in a divided state, thereby making it practicable to transmit all data before a conventional congestion occurs and, if data drop occurs on communication routes, suppress the data drop by retransmission request, thereby realizing the stable reproduction of stream data.

It should be noted that, in the above-mentioned examples, the transmission and reception are executed by use of a plurality of RPT data flows (or a plurality of UDP ports) in one RTP session. It is also practicable, as shown in FIG. 14, to arrange session dividing program 141 for dividing a RTP session itself and a session combining program 142 for combining the divided session on the layer higher than that of the RTSPs 62 and 82.

Figure 15:
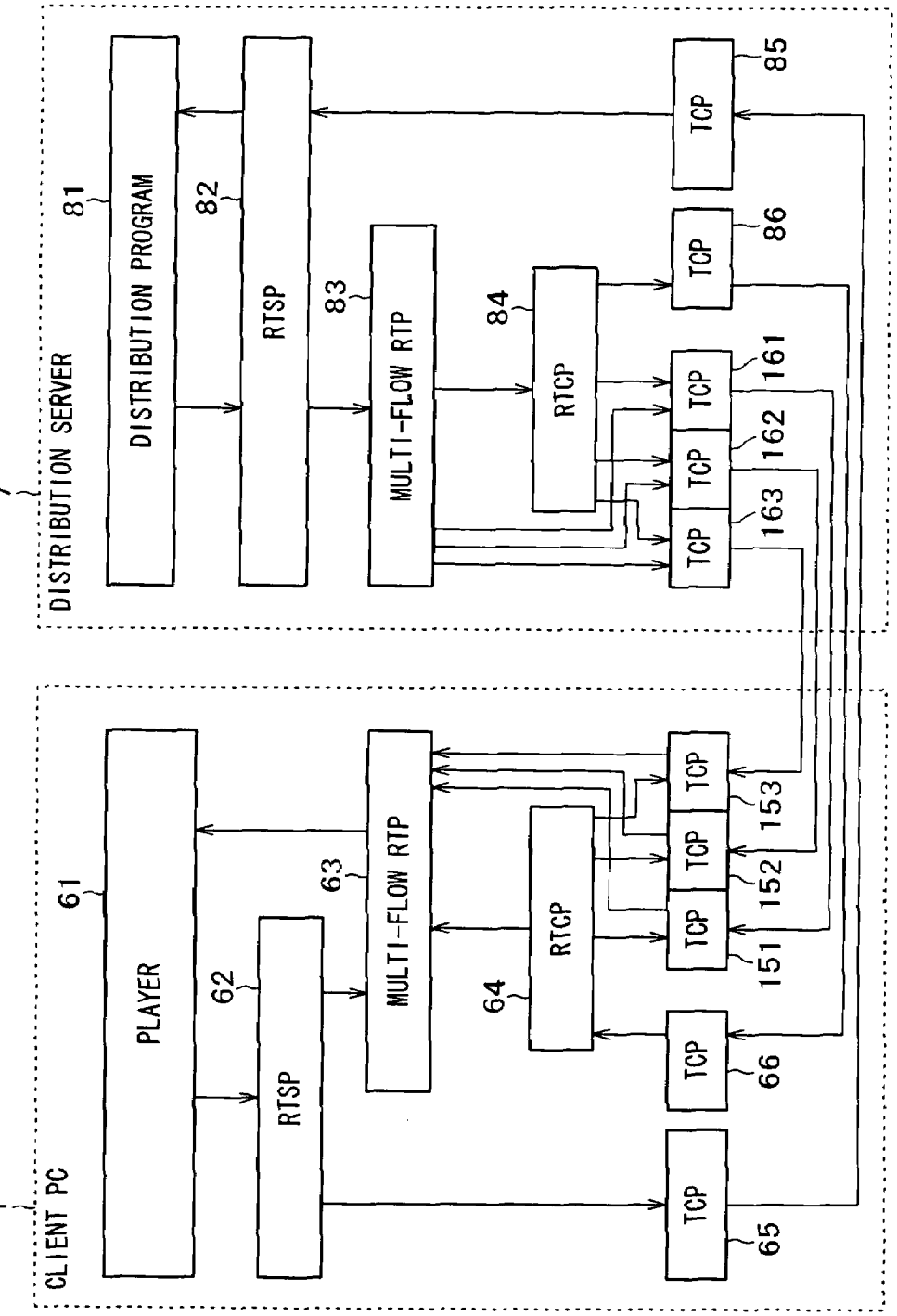
FIG. 15 is a schematic diagram illustrating yet other functions that are realized by the client PC and the distribution server shown in FIG. 2.

In the above-mentioned examples, the data consisting of one RTP session is divided into a plurality of RPT data flows (or a plurality of UDP ports) before being simultaneously transmitted or received. As shown in FIG. 15 for example, TCP ports 151 through 153 and 161 through 163 may be arranged in place of the UDP ports 67 through 69 and 87 through 89. In this case, although the communication rate may lower as compared with that of the UDP ports, the TCP has a function of confirming the arrival of data, thereby realizing the more stable distribution of stream data.

Figure 14:
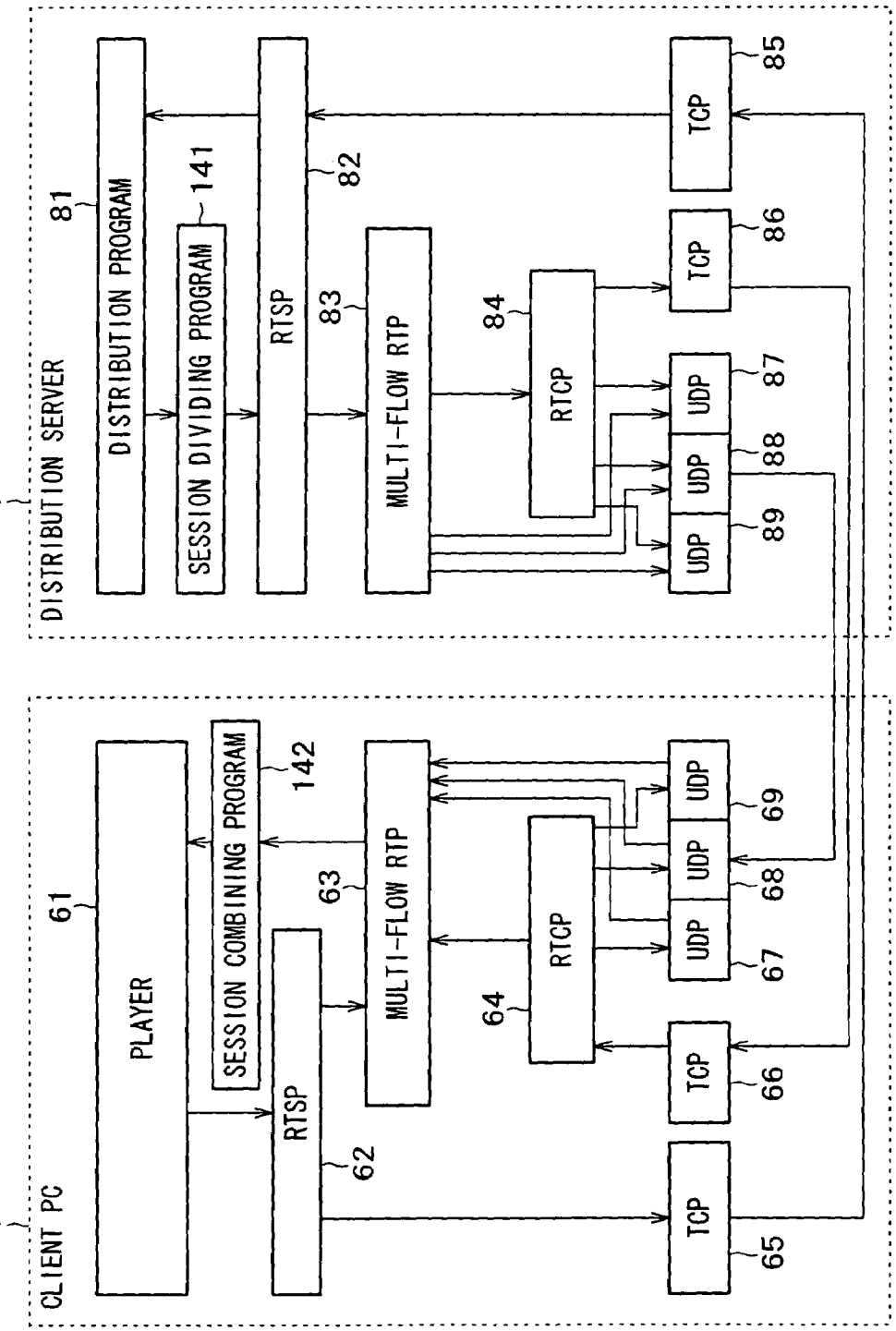
FIG. 14 is a schematic diagram illustrating still other functions that are realized by the client PC and the distribution server shown in FIG. 2.

It should be noted that, with reference to FIGS. 14 and 15, the multi-flow RTPs 63 and 83 may be replaced by the multi-flow RTPs with retransmission processing capability 101 and 111 shown in FIG. 10, thereby providing the retransmission processing function. Also, in the above-mentioned examples, there are three UDP ports 67 through 69 and three UDP ports 87 through 89; however the number of UDP ports may be configured other than these UDP ports or TCP ports.

In the above-mentioned examples, data consisting of one RTP session is divided before being transmitted; it is also practicable data consisting of one RTP session be transmitted at the same time from a plurality of UDP ports.

Figure 16:
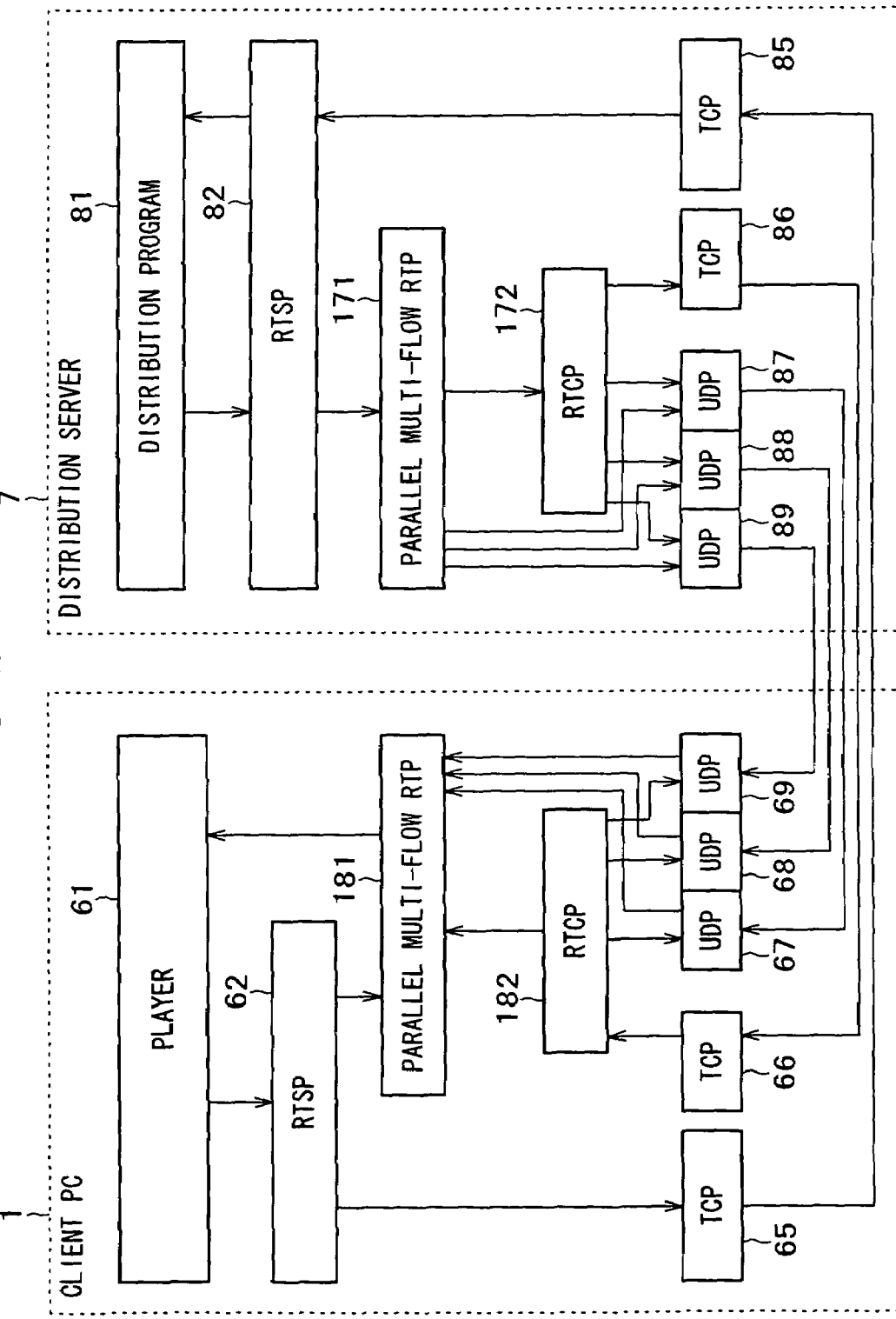
FIG. 16 is a schematic diagram illustrating still yet other functions that are realized by the client PC and the distribution server shown in FIG. 2.

FIG. 16 illustrates the functions that are realized by the client PC 1 and the distribution server 7 for transmitting data consisting of one RTP session at the same time from a plurality of UDP ports. It should be noted the functions similar to those realized by the client PC 1 and the distribution server 7 shown in FIG. 4 are denoted by the same reference numerals and their description will be skipped.

In the client PC 1 and the distribution server 7 shown in FIG. 16, the functions differing from those in the client PC 1 and the distribution server 7 shown in FIG. 4 are parallel multi-flow RTPs 171 and 181 and RTCPs 172 and 182 in place of the multi-flow RTPs 63 and 83 and the RTCPs 64 and 84. The parallel multi-flow RTP 171 has basically the same function as that of the multi-flow RTP 63, but supplies data to the UDP ports 87 through 89 without dividing and supplies, to the RTCP 172, a control signal for identifying the data to be transmitted. The RTCP 172 is basically the same as the RTCP 84 but, because the stream data to be transmitted is not divided, controls the TCP port 86 to supply not the control information for reconstructing the divided data but the control signal for identifying transmission data to the client PC 1 and controls the UDP ports 87 through 89 to transmit the data to the client PC 1 from these UDP ports.

Further, the parallel multi-flow RTP 181 controls the RTCP 182 to receive the control information for identifying the data transmitted from the distribution server 7 through the TCP port 66 and, when the data (or packets) identified by this control information is received at any of the UDP ports 67 through 69, discards the data received by any other UDP ports 67 through 69 and, at the same time, supplies the initially received data to the player 61 for reproduction.

Figure 17:
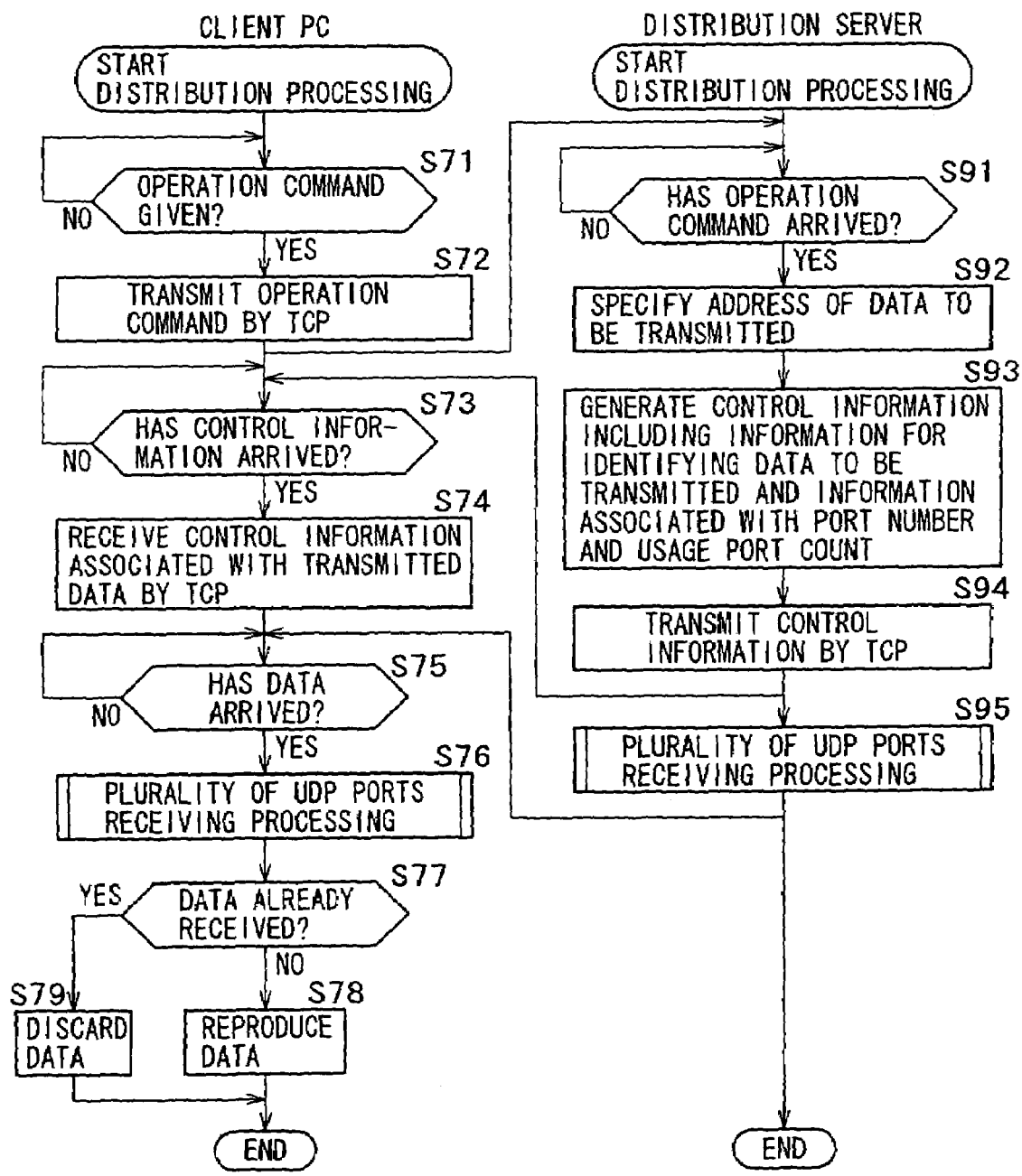
FIG. 17 is a flowchart indicative of the distribution processing by the functions shown in FIG. 16.

The following describes the distribution processing to be executed by a distribution system composed of the client PC 1 and the distribution server 7 shown in FIG. 16 with reference to the flowchart shown in FIG. 17. It should be noted that the processes of steps S71 and S72 and the processes of steps S91 and S92 in the flowchart of FIG. 17 are the same as those of steps S1 and S2 and steps S91 and S92, so that their description will be skipped.

In step S93, the parallel multi-flow RTP 171 reads the stream data to be transmitted on the basis of its address information supplied from the RTSP 82 and generates the control information including the information for identifying this stream data and the information about the port numbers of any of the UDP ports 87 through 89 that are used for the communication and the used port count.

In step S94, the parallel multi-flow RTP 171 controls the RTCP 84 to transmit the control information including the information for identifying this stream data and the information about the port numbers of any of the UDP ports 87 through 89 that are used for the communication and the used port count to the client PC 1 through the TCP port 86.

In step S95, the processing of transmitting a plurality of UDP ports is executed, in which the stream data for transmission is supplied from the parallel multi-flow RTP 171 to UDP ports 87 through 89 to be transmitted to the client PC 1. Namely, this processing transmits the same stream data to the client PC 1 through a plurality of UDP ports 87 through 89 at the same time. It should be noted that, in the process of step S95, the data to be transmitted is not divided unlike in steps S16 and S56, but the processing itself that uses a plurality of UDP ports 87 through 89 remains the same among these steps.

In step S73, the RTCP 182 controls the TCP port 66 to determine whether or not the control information has been transmitted from the distribution server 7 and repeats this processing until the control information receives. For example, if the control information has transmitted by the processing of step S93, then the procedure goes to step S74.

In step S74, the processing of transmitting a plurality of UDP ports is executed, in which the RTCP 182 controls the TCP port 66 to receive the control information and supply the received control information to the parallel multi-flow RTP 181. It should be noted that, in step S74, the data to be received is not divided unlike in steps S6 and S36, but the processing itself that uses a plurality of UDP ports 67 through 69 remains the same among these steps.

In step S75, on the basis of the control information, the parallel multi-flow RTP 171 determines whether or not the transmitted stream data has been received at any of the UDP ports 67 through 69 and repeats this processing until the stream data is received. For example, if the processing of receiving a plurality of UDP ports was executed in step S76 through the processing of step S94 and the stream data transmitted from any of the UDP ports 87 through 89 has been received, the procedure goes to step S77.

In step S77, the parallel multi-flow RTP 171 compares the stream data received from any of the UDP ports 67 through 69 with the received control information to determine whether or not the stream data is one that has received already. To be more specific, the parallel multi-flow RTP 171 compares the information for identifying the received stream data with the information for identifying the stream data to be transmitted included in the control information to determine whether or not the received stream data is the stream data to be transmitted. If the stream data is found one that is to be transmitted, parallel multi-flow RTP 171 determines whether or not the stream data is one that has received already. For example, if the received stream data is found the first stream data that has not been received in step S76, then the procedure goes to step S77.

In step S77, the parallel multi-flow RTP 171 supplies the received stream data to the player 61 for reproduction.

If the received stream data is found one that has received already in step S77, namely, because stream data is transmitted through a plurality of UDP ports in parallel, if a plurality of pieces of stream data are received at a plurality of UDP ports without being partially or totally discarded along communication routes by the processing of step S94, then the parallel multi-flow RTP 171 discards the packets of the second and subsequent stream data in step S78.

For this reason, in the related-art data forwarding based on packets, if packets are discarded by any of the routers along communication routes and therefore reproduction goes on without stream data that is moving images for example, the degradation of picture quality occurs, which must be avoided by lowering the picture quality. In the novel configuration according to the invention, the above-mentioned processing allows the same stream data to be forwarded through a plurality of ports in parallel, so that, if any one of the stream data transmitted in parallel arrives, a situation in that no stream data arrives can be avoided, resulting in the enhanced reliability of communication. In addition, at the time any one of correct packets has arrived, the other packets are discarded, so that the data forwarding of enhanced reliability can be realized while making the most of the UDP-based communication faster because no response of confirmation is needed than the TCP-based communication.

With a single TCP connection or a single UDP packet, the volume of data that can be transmitted in a single connection or a single packet is restricted. And, in the case of the TCP method, it is difficult to fully use the available band with a single connection due to flow control, for example. The above-mentioned processing according to the invention allows the forwarding by use of a plurality of ports based on TCP or UDP, thereby using the band up to the proximity of its limit, which in turn enhances the forwarding capacity.

Namely, dividing the stream data to be transmitted and simultaneously transmitting/receiving the divided data through a plurality of ports allows the high-speed forwarding of data. In addition, in the transmission of the same data through a plurality of ports, the receiving of the same data through a plurality of ports with packet discard considered allows the forwarding at the same transmission/reception rate as that of the related-art single-port method while enhancing the reliability of communication.

Further, the forwarding by use of a plurality of ports as described above allows the high-speed forwarding of necessary data by arranging the cache function on the client PC 1. Moreover, increasing the network utilization ratio by a plurality of forwarding connections allows preventing the lowering of communication rate due to flow control caused by the use of a single port by general communication and the lowering of communication rate due to router priority control caused by long time use and lowered communication frequency, for example.

The following describes the processing of transmitting a plurality of UDP ports in a round-robin manner and the processing of receiving a plurality of UDP ports with reference to the flowchart shown in FIG. 18. In the flowchart shown in FIG. 18, the processing of transmitting through a plurality of UDP ports and the processing of receiving through a plurality of UDP ports are described detailed processing of steps S6 and S16. The same holds with steps S36 and S56 in the flowchart shown in FIG. 11 and steps S76 and S95 in the flowchart shown in FIG. 17.

In step S111, the multi-flow RTP 83 initializes the counter p for identifying UDP ports 87 through 89. It should be noted that, in the following description, counter p=1 corresponds to the UDP port 87, counter p=2 to the UDP port 88, and counter p=3 to the UDP port 89. Since the number of UDP ports is 3, the upper limit of counter p is 3 but not exclusively.

In step S112, the multi-flow RTP 83 checks the UDP port corresponding to counter p. Namely, the UDP port corresponding to counter p is one that corresponds to counter p=1 in the first check processing, for example.

Figure 19:
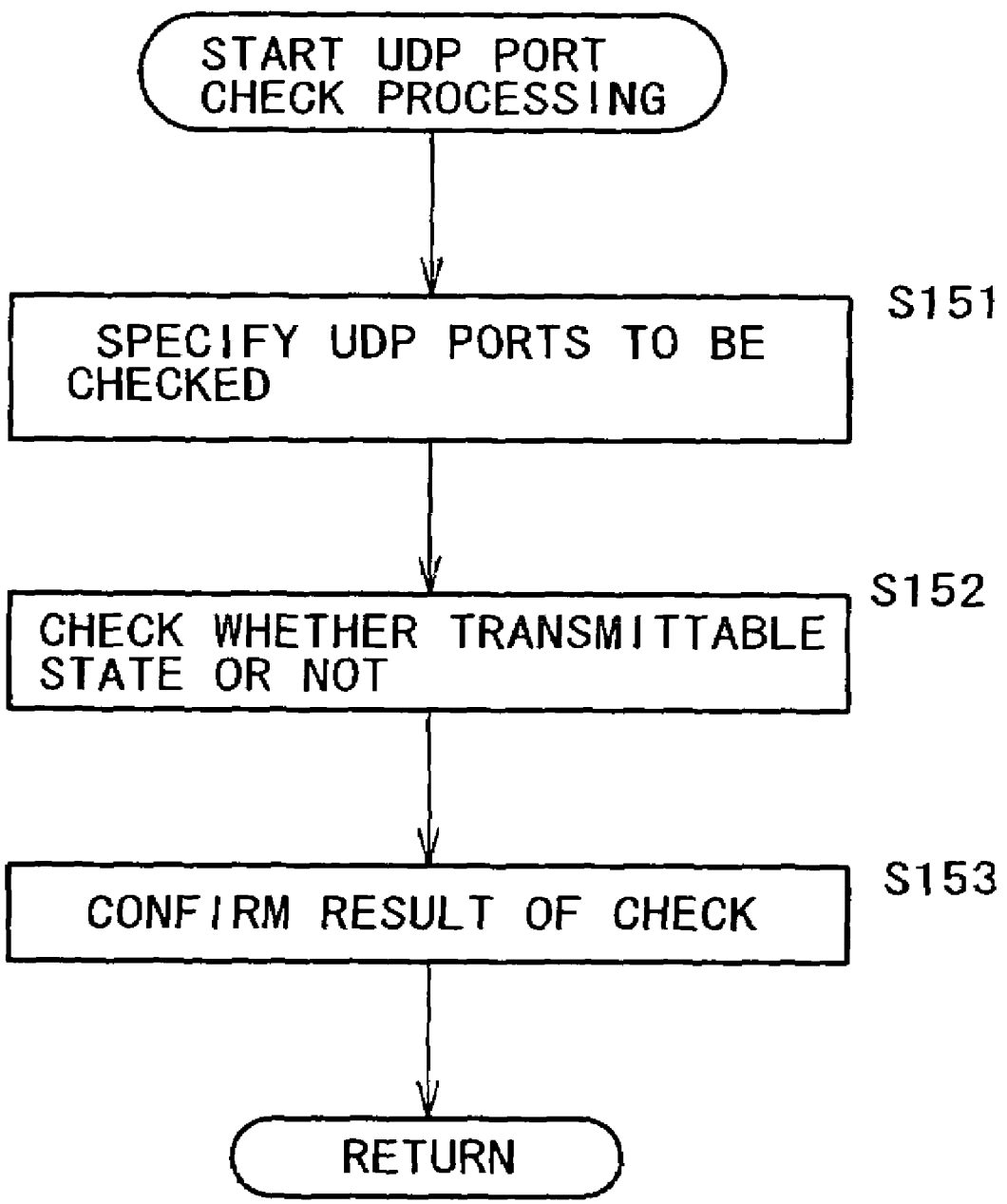
FIG. 19 is a flowchart indicative of UDP port check processing.
Figure 20:
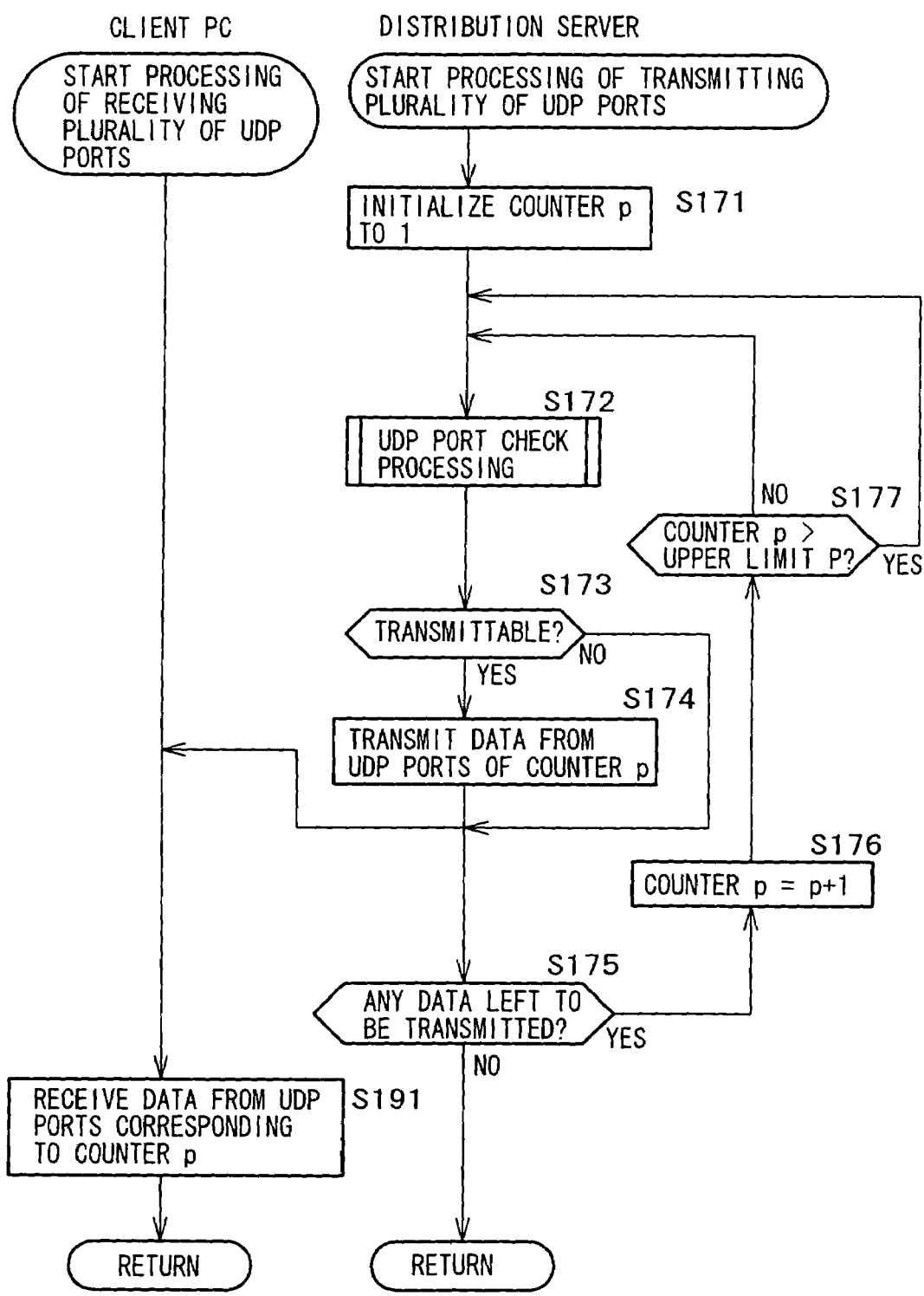
FIG. 20 is a flowchart indicative of the processing of transmitting and receiving data through a plurality of UDP ports in a no-delay manner.

The following describes UDP port check processing with reference to the flowchart shown in FIG. 19.

In step S151, the multi-flow RTP 83 specifies the UDP port to be checked. To be more specific, if SystemV (trademark) of UNIX (trademark) is used as the OS, the multi-flow RTP 83 executes FD-SET (a standard macro of the OS (namely, SystemV)) to specify the descriptor for identifying the UDP port corresponding to counter p to be checked.

In step S152, the multi-flow RTP 83 checks to see whether or not the UDP port subject to check is communicable. To be more specific, the multi-flow RTP 83 executes select( ) function (a standard function of the OS (namely SystemV)) for example to check the operation state of descriptor specified by FD-SET (to be more specific, whether the socket of the UDP port subject to check is writable or not is checked).

In step S153, the multi-flow RTP 83 confirms the result of the check whether or not the UDP port subject to check is communicable. To be more specific, the multi-flow RTP 83 executes FD-SET to confirm the result of select( ) function for example.

As described above, the processing of steps S151 through S153 checks whether or not one UDP port subject to check specified by counter p is transmittable.

Here, the flowchart shown in FIG. 18 is referred to again.

In step S113, the multi-flow RTP 83 determines whether or not the UDP port corresponding to counter p subject to check is transmittable. If the UDP port is found not transmittable because it is transmitting another piece of data for example, then the procedure returns to step S112, thereby repeating steps S112 and S113 until the UDP becomes transmittable.

If the UDP port is found transmittable in step S113, then the procedure goes to step S114.

In step S114, the RTCP 84 controls the UDP port corresponding to counter p to transmit the stream data divided by the multi-flow RTP 83 to the client PC 1.

In step S131, on the basis of the port numbers for identifying UDP ports 67 through 69 for use in communication and used port count included in the control information, the RTCP 64 controls the UDP ports 67 through 69 to receive the transmitted divided stream data and supply the received stream data to the multi-flow RTP 63. Namely, the divided stream data is received by any of the UDP ports 67 through 69 that correspond to counter p described above.

On the other hand, in step S115, the multi-flow RTP 83 determines whether or not any divided stream data remains to be transmitted. If there is no more stream data to be transmitted, the processing ends.

If any divided stream data is found in step S115 remaining to be transmitted, then the multi-flow RTP 83 increments counter p by 1 in step S116.

In step S117, the multi-flow RTP 83 determines whether or not the counter p is greater than upper limit P. If the counter p is found not greater than upper limit P, then the procedure returns to step S112.

If the counter p is found greater than upper limit P in step S117, the procedure returns to step S111.

Namely, the processing described above determines whether or not the UDP ports 87, 88, and 89 are transmittable in this order. When the check of the UDP port 89 has been completed, it is determined whether or not the UDP port 87 is transmittable, and so on. If a particular UDP port is not transmittable, the processing waits until that UDP port becomes transmittable, upon which the stream data is transmitted from that UDP port. After this, the next UDP port is checked. Consequently, the divided stream data is always allocated to the UDP ports 87, 88, 89, 87, 88, 89, and so on in this order (namely, in a round robin manner). Consequently, the client PC 1 receives the stream data through the UDP ports 67, 68, 69, 67, 68 69, and so on in this order.

As a result, the divided stream data is efficiently transmitted through a plurality of UDP ports. It should be noted that, referring to FIG. 7, it is supposed that the same stream data be transmitted in parallel from a plurality of UDP ports 87, 88, and 89 but the timings are different as described above.

The following describes the processing of transmitting a plurality of UDP ports and the processing of receiving a plurality of ports in a no-delay manner with reference to the flowchart shown in FIG. 19. It should be noted that steps S171 through S177 and S191 in the flowchart shown in FIG. 19 are the same as steps S111 through S117 and S131 in the flowchart shown in FIG. 17, so that their description will be skipped.

Namely, the steps in the flowchart shown in FIG. 19 are the same as the steps in the flowchart shown in FIG. 17. However, in FIG. 17, if the transmission is found disabled in step S174, then step S174 is skipped and the procedure goes to step S175.

Consequently, there is no wait state until the UDP port found not transmittable becomes transmittable. For this reason, the sequence of transmission through a plurality of UDP ports 87 through 89 is not constant. If a UDP port is found not transmittable, another UDP port is immediately checked. The transmission of divided stream data is allocated by priority to the transmittable UDP port at that time.

As a result, the processing of transmitting through a plurality of UDP ports and the processing of receiving through a plurality of UDP ports in a no-delay manner are able to transmit stream data faster than those in a round-robin manner.

In the above-mentioned examples, a plurality of UDP ports are used for examples of using a plurality of ports. However, because the above-mentioned processing is protocol-independent processing, the plurality of ports need not be UDP ports; for example, the same effects are achieved by use of a plurality of TCP ports.

Figure 21:
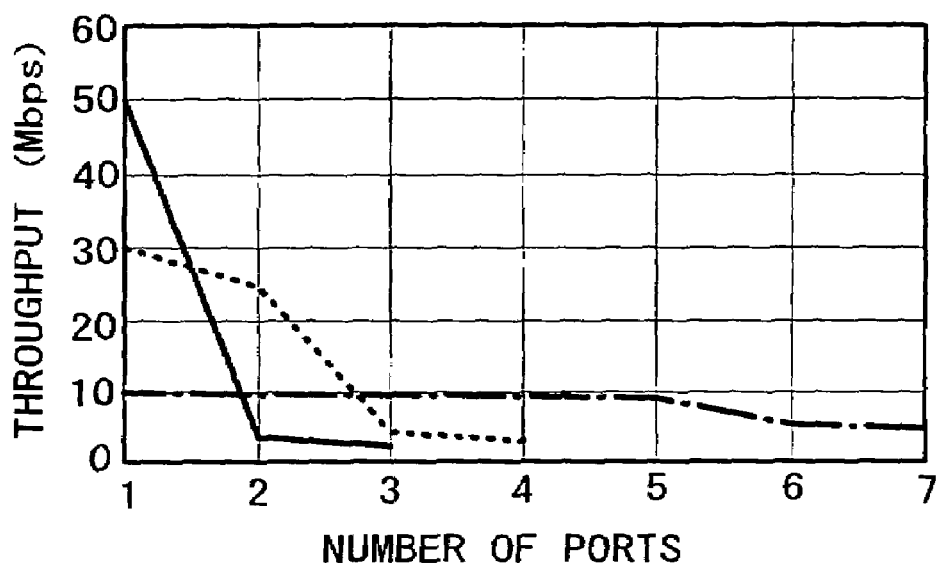
FIG. 21 is a graph illustrating a relationship between the number of UDP ports and throughput in the processing of transmitting and receiving data through a plurality of UDP ports in a round-robin manner.
Figure 22:
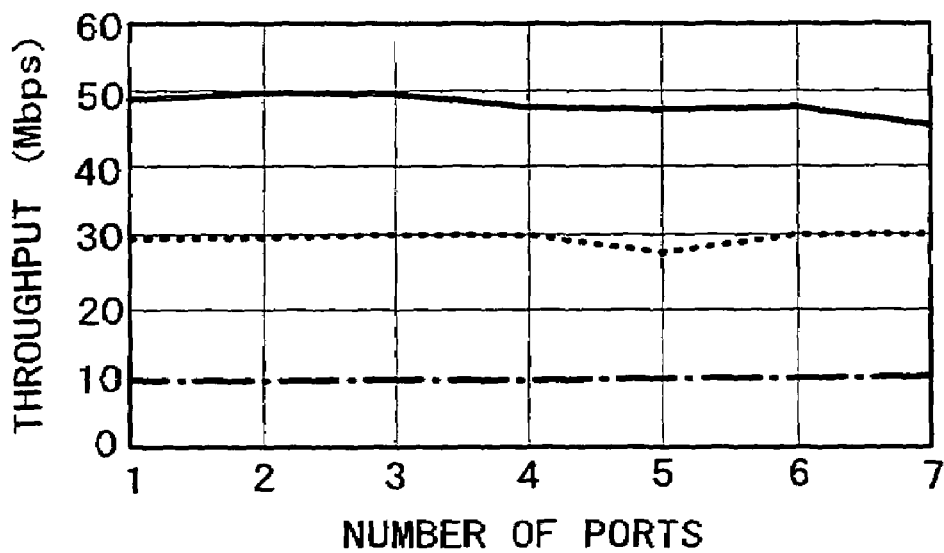
FIG. 22 is a graph illustrating a relationship between the number of UDP ports and throughput in the processing of transmitting and receiving data through a plurality of UDP ports in a no-delay manner.

FIG. 21 and FIG. 22 illustrate the relationship between the number of TCP ports and throughput in the transmission and reception through a plurality of TCP ports in a round-robin manner and in a no-delay manner, respectively. Referring to FIGS. 21 and 22, solid lines indicate the communication route of a band in which up to 50 Mbps is usable, dotted lines indicate the communication route of a band in which up to 30 Mbps is usable, and dot-and-dash lines indicate the communication route of band in which up to 10 Mbps is usable. The vertical axis indicates throughput (Mbps) and the horizontal axis indicates the number of TCP ports.

As shown in FIG. 21, in the round-robin method, a steep throughput drops are observed at two ports in a band of maximum 50 Mbps, three ports in a band of maximum 30 Mpbs, and six ports in a band of maximum 10 Mbps.

On the other hand, as shown in FIG. 22, in the no-delay method, the bandwidth can be fully used regardless of the number of TCP ports in any of the bands of maximum 50 Mbps, maximum 30 Mbps, and maximum 10 Mbps.

As a result, as seen from FIGS. 21 and 22, the no-delay method is able to use the bands more fully than the round-robin method in the communication based on a plurality of TCP ports, thereby realizing the faster transmission and reception of data. It should be noted that, obviously, the same effects described with reference to FIGS. 21 and 22 are achieved with a plurality of UDP ports.

As described and according to the invention, transmitting the communication data of one session in the session layer through a plurality of ports in the transport layer realizes high-speed and stable communication.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 3, these recording media are constituted not only by a package media made up of the magnetic disk 21 (including flexible disks), the optical disk 22 (including CD-ROM (Compact Disk Read Only Memory) and DVD (Digital Versatile Disc)), the magneto-optical disk 23 (including MD (Mini Disc) (trademark)), or the semiconductor memory 24 which is distributed separately from the apparatus itself, but also by the ROM 22 or the storage section 28 which stores programs and is provided to users as incorporated in the apparatus itself.

It should be noted herein that the steps for describing each program recorded in recording media include not only the processing operations which are sequentially executed in time-series but also the processing operations which are executed concurrently or discretely.

It should also be noted that term "system" as used herein denotes an entire apparatus configured by a plurality of component units.

While a preferred embodiment of the present invention has been described using specific terms, such description is for illustrative purpose only, and it is to be understood that changes and variations may be made without departing from the spirit or scope of the following claims.

What is claimed is:

1. A transmission apparatus comprising:
   a plurality of first transmission units configured to transmit data by a first protocol of a transport layer;
   a generation unit configured to generate control information for reproducing said data, said control information including port numbers and a used port count of said plurality of first transmission units;
   a second transmission unit configured to transmit, by a second protocol of said transport layer, said control information generated by said generation unit; and
   a control unit configured to control data for transmission by a protocol of a session layer such that said data is allocated to said plurality of first transmission units in accordance with each of operation states and the allocated data is transmitted.

2. The transmission apparatus according to claim 1, wherein said control unit controls said data for transmission by said protocol of said session layer such that said data is allocated to said plurality of first transmission units in accordance with the operation state thereof in a round-robin manner and the allocated data is transmitted.

3. The transmission apparatus according to claim 1, wherein said control unit transmits said data for transmission by said protocol of said session layer such that said data is allocated to transmittable one of said plurality of first transmission unit and the allocated data is transmitted.

4. The transmission apparatus according to claim 1, further comprising:
   a division unit configured to divide said data to be transmitted by said protocol of said session layer into a plurality of pieces of data;
   wherein said control unit controls said plurality of pieces of data obtained by said division unit such that said data is allocated to said plurality of first transmission units in accordance with each of operation states and the allocated data is transmitted by said first protocol of said transport layer.

5. The transmission apparatus according to claim 1, wherein said generation unit generates control information for combining divided data when said data is divided by said division unit, said control information including said port numbers and said used port count of said plurality of first transmission units.

6. The transmission apparatus according to claim 1, wherein said control unit controls such that same data to be transmitted by said protocol in said session layer is transmitted by said first protocol in said transport layer by each of said plurality of first transmission units.

7. The transmission apparatus according to claim 6, wherein said generation unit generates control information for identifying data to be transmitted by said protocol in said session layer to reproduce said data, said control information including said port numbers and said used port count of said plurality of first transmission units.

8. The transmission apparatus according to claim 1, wherein said second protocol is TCP.

9. The transmission apparatus according to claim 1, wherein said protocol in said session layer is RTP.

10. The transmission apparatus according to claim 1, wherein said first protocol in said transport layer is a protocol that does not confirm the arrival of transmitted data.

11. The transmission apparatus according to claim 10, wherein said first protocol in said transport layer that does not confirm the arrival of transmitted data is UDP.

12. The transmission apparatus according to claim 1, wherein said first protocol in said transport layer is TCP.

13. A transmission method comprising:
a plurality of first transmission steps for transmitting data by a first protocol of a transport layer by a transmission unit;
a generation step for generating control information for reproducing said data, said control information including port numbers and a used port count of said plurality of first transmission steps;
a second transmission step for transmitting said control information generated by said generation step by a second protocol of said transport layer; and
a control step for controlling data to be transmitted by a protocol of a session layer so as to be transmitted in accordance with each of operation states of said plurality of first transmission steps.

14. A recording medium in which a computer-readable program is recorded which causes a transmitter to execute a method of transmitting data, comprising:
a plurality of first transmission control steps for controlling transmission of data by a first protocol of a transport layer by the transmitter;
a generation control step for controlling generation of control information for reproducing said data, said control information including port numbers and a used port count of said plurality of first transmission steps;
a second transmission control step for controlling transmission, by a second protocol of said transport layer, said control information generated by said generation control step; and
an operation control step for controlling data to be transmitted by a protocol of a session layer so as to be transmitted in accordance with each of operation states of said plurality of first transmission control steps.

15. A reception apparatus comprising:
a plurality of first reception units configured to receive data by a first protocol of a transport layer;
a second reception unit configured to receive control information for reproducing said data by a second protocol of said transport layer, said control information including port numbers and a used port count of said plurality of first reception units; and
a reproduction unit configured to reproduce, as data received by a protocol of a session layer, said data on the basis of said control information.

16. The reception apparatus according to claim 15, wherein said data is a plurality of divided data;
said plurality of first reception units receive said plurality of divided data; and
said reproduction unit combines, for reproduction, said plurality of divided data as received data of said protocol in said session layer on the basis of said control information including information for combining said divided data and reproducing the combined data in addition to said port numbers and said used port count received by said second reception unit.

17. The reception apparatus according to claim 15, wherein said data is a plurality of the same data;
said plurality of first reception units receive each of said plurality of the same data; and
said reproduction unit reproduces data received first as received data of said protocol in said session layer among said plurality of first reception units on the basis of said control information including information for identifying said data in addition to said port numbers and said used port count received by said second reception unit.

18. The reception apparatus according to claim 15, wherein said second protocol is TCP.

19. The reception apparatus according to claim 15, wherein said protocol in said session layer is RTP.

20. The reception apparatus according to claim 15, wherein said first protocol in said transport layer is a protocol that does not confirm the arrival of transmitted data.

21. The reception apparatus according to claim 20, wherein said first protocol, which does not confirm the arrival of transmitted data, in said transport layer is UDP.

22. The reception apparatus according to claim 15, wherein said first protocol in said transport layer is TCP.

23. A reception method comprising:
a plurality of first reception steps for receiving data by a first protocol of a transport layer by a receiving unit;
a second reception step for receiving control information for reproducing said data by a second protocol of said transport layer, said control information including port numbers and a used port count of said plurality of first reception steps; and
a reproduction step for reproducing said data on the basis of said control information as data received by a protocol of a session layer.

24. A recording medium in which a computer-readable program is recorded, which causes a receiver to execute a method of receiving data, comprising:
a plurality of first reception control steps for controlling reception of data by a first protocol of a transport layer by the receiver;
a second reception control step for controlling reception of control information for reproducing said data by a second protocol of said transport layer, said control information including port numbers and a used port count of said plurality of first reception control steps; and a reproduction control step for controlling reproduction of said data on the basis of said control information as data received by a protocol of a session layer.

25. A communication system based on a transmission apparatus and a reception apparatus, said transmission apparatus comprising:

a plurality of transmission units configured to transmit data by a protocol of a transport layer;

a generation unit configured to generate control information for reproducing said data, said control information including port numbers and a used port count of said plurality of first transmission units;

a second transmission unit configured to transmit, by a second protocol of said transport layer, said control information generated by said generation unit; and a control unit configured to control data for transmission by a protocol of a session layer such that said data is allocated to said plurality of first transmission units in accordance with each of operation states and the allocated data is transmitted;

said reception apparatus comprising:

a reception unit configured to receive data by a protocol of a transport layer;

a second reception unit configured to receive control information for reproducing said data by a second protocol of said transport layer, said control information including port numbers and a used port count of said first reception units; and a reproduction unit configured to reproduce said data on the basis of said control information as data received by a protocol of a session layer.

* * * * *